United States Patent
Sekiguchi et al.

(10) Patent No.: US 8,384,845 B2
(45) Date of Patent: Feb. 26, 2013

(54) LIQUID CRYSTAL DISPLAY DEVICE AND ILLUMINATING DEVICE

(75) Inventors: Yoshifumi Sekiguchi, Mobara (JP); Yoshiro Mikami, Hitachiota (JP); Ikuo Hiyama, Hitachinaka (JP); Naoki Iwasaki, Mobara (JP); Masaki Tsubokura, Mobara (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 223 days.

(21) Appl. No.: 13/012,085

(22) Filed: Jan. 24, 2011

(65) Prior Publication Data
US 2011/0181809 A1    Jul. 28, 2011

(30) Foreign Application Priority Data
Jan. 25, 2010 (JP) ................ 2010-013569

(51) Int. Cl.
*G02F 1/1335* (2006.01)
*F21V 8/00* (2006.01)
(52) U.S. Cl. ............... 349/62; 349/56; 349/58; 362/613; 362/97.1; 362/97.2
(58) Field of Classification Search .......... 349/56, 349/58, 61, 65, 66, 72, 62; 362/97.1, 97.2, 362/97.3, 97.4, 613
See application file for complete search history.

(56) References Cited

U.S. PATENT DOCUMENTS

| | | | |
|---|---|---|---|
| 6,595,651 B2* | 7/2003 | Jeong et al. | 362/600 |
| 6,854,858 B2* | 2/2005 | Jeong et al. | 362/633 |
| 6,985,131 B2* | 1/2006 | Kawada et al. | 345/102 |
| 7,092,048 B2* | 8/2006 | Jeong | 349/58 |
| 7,969,525 B2* | 6/2011 | Watanabe | 349/58 |
| 8,269,911 B2* | 9/2012 | Watanabe et al. | 349/58 |
| 2002/0060758 A1* | 5/2002 | Jeong et al. | 349/65 |
| 2007/0085944 A1 | 4/2007 | Tanaka et al. | |
| 2007/0194340 A1 | 8/2007 | Akiba et al. | |
| 2007/0229726 A1 | 10/2007 | Azuma et al. | |
| 2008/0002098 A1 | 1/2008 | Imajo et al. | |
| 2008/0002412 A1 | 1/2008 | Tanaka et al. | |
| 2008/0186431 A1 | 8/2008 | Imojo et al. | |
| 2008/0297687 A1* | 12/2008 | Watanabe | 349/58 |
| 2008/0297695 A1 | 12/2008 | Sekiguchi et al. | |

(Continued)

FOREIGN PATENT DOCUMENTS

JP    2005-301119    10/2005
JP    2007-144728    5/2007

(Continued)

*Primary Examiner* — Brian Healy
(74) *Attorney, Agent, or Firm* — Antonelli, Terry, Stout & Kraus, LLP.

(57) ABSTRACT

The side surface of the light guide plate includes an incident surface which faces the light source unit in an opposed manner, and a fixing surface which is directed in the left-and-right direction orthogonal to the top-and-bottom direction which is the direction along which the light source unit and the incident surface each other in an opposed manner. An engaging portion which is engageable with a lower frame is formed on the fixing surface or an edge portion which forms the fixing surface. The engaging portion is configured to allow a change of a distance between the incident surface and the lower frame due to expansion or shrinkage of the light guide plate while restricting the movement of the light guide plate in the top-and-bottom direction.

25 Claims, 16 Drawing Sheets

U.S. PATENT DOCUMENTS

| | | |
|---|---|---|
| 2009/0096957 A1 | 4/2009 | Hiyama et al. |
| 2009/0109368 A1* | 4/2009 | Watanabe et al. ............... 349/58 |
| 2009/0167990 A1 | 7/2009 | Konno et al. |
| 2011/0181809 A1* | 7/2011 | Sekiguchi et al. ............. 349/62 |

FOREIGN PATENT DOCUMENTS

| | | |
|---|---|---|
| JP | 2007-140453 | 6/2007 |
| JP | 2007-220925 | 8/2007 |
| JP | 2007-279193 | 10/2007 |
| JP | 2008-10693 | 1/2008 |
| JP | 2008-14984 | 1/2008 |
| JP | 2008-191237 | 8/2008 |
| JP | 2009-9080 | 1/2009 |
| JP | 2009-32664 | 2/2009 |
| JP | 2009-98310 | 5/2009 |
| JP | 2009-110811 | 5/2009 |
| JP | 2009-163902 | 7/2009 |
| JP | 2010-8682 | 1/2010 |
| WO | WO 2009/157355 A1 | 12/2009 |

* cited by examiner

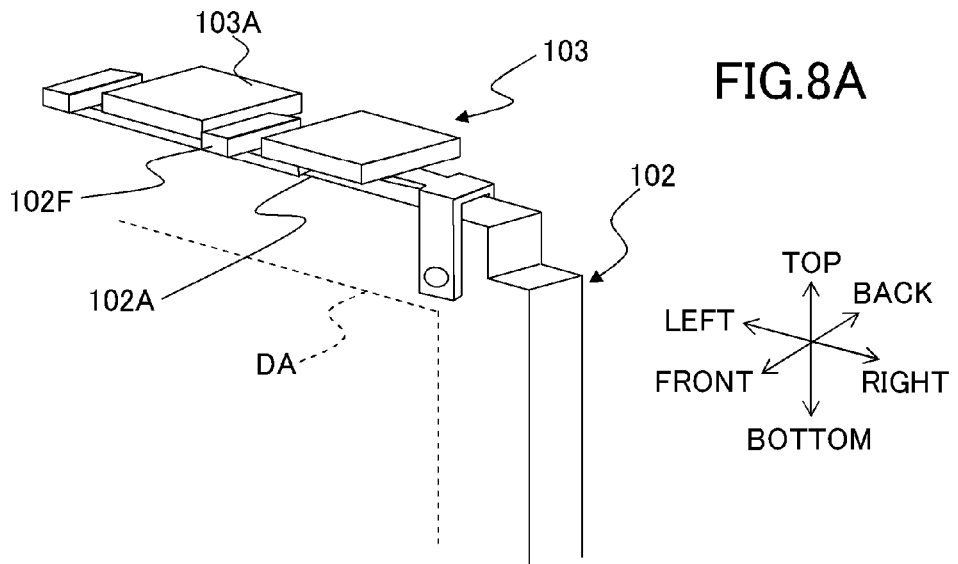
FIG.8A
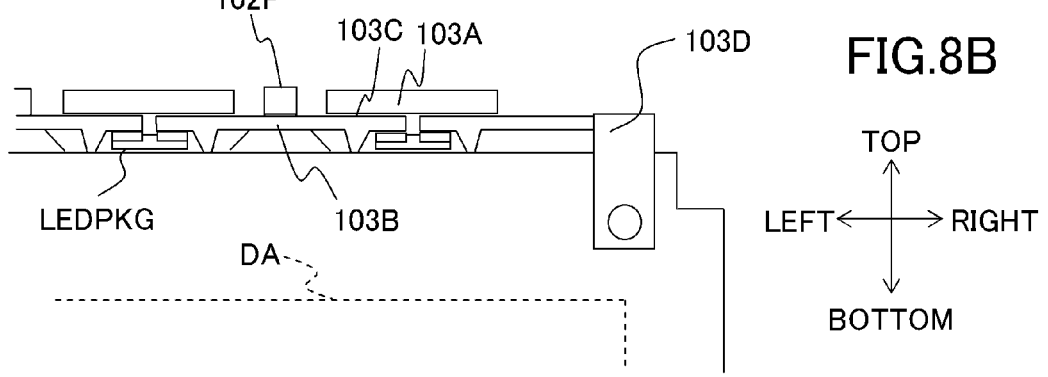
FIG.8B
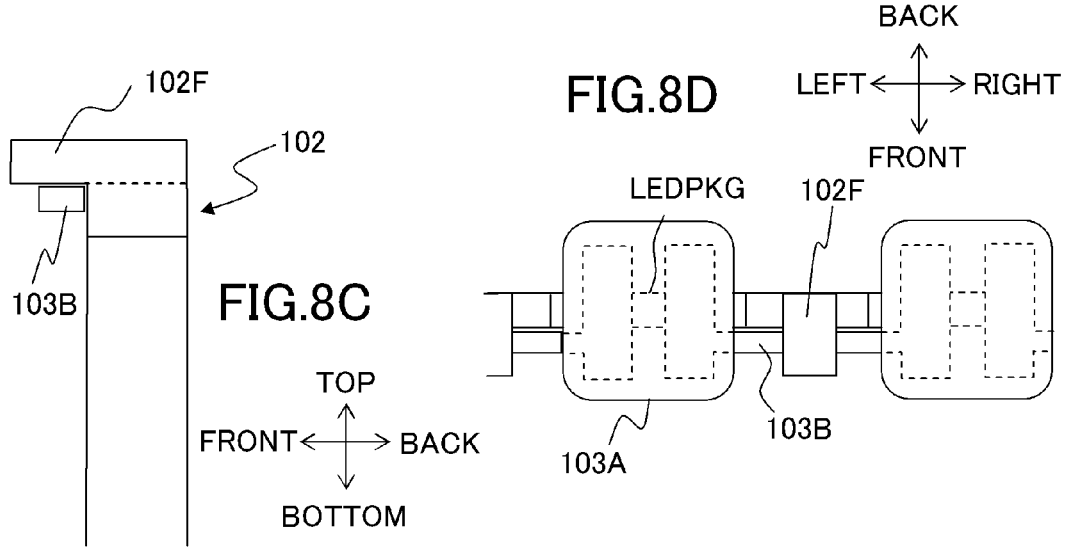
FIG.8C
FIG.8D

FIG.16A
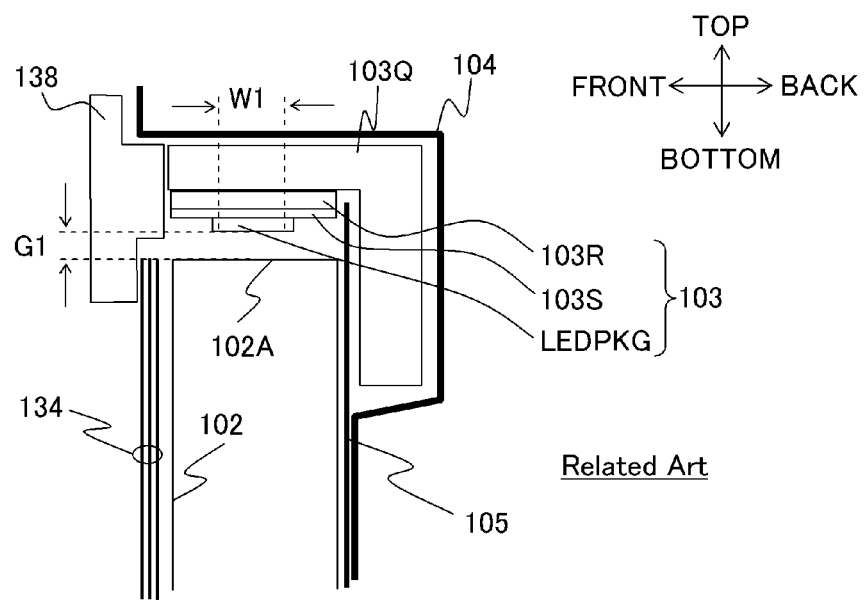
FIG.16B
FIG.16C
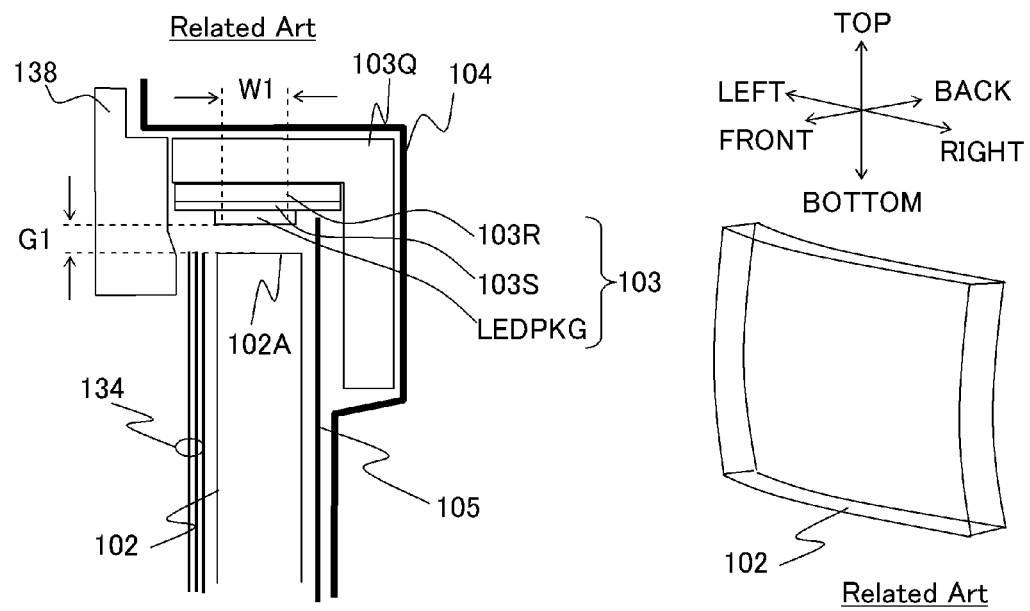

LIQUID CRYSTAL DISPLAY DEVICE AND ILLUMINATING DEVICE

CROSS-REFERENCE TO RELATED APPLICATION

The present application claims priority from Japanese application JP2010-013569 filed on Jan. 25, 2010, the content of which is hereby incorporated by reference into this application.

BACKGROUND OF THE INVENTION

1. Field of the Invention

The present invention relates to a liquid crystal display device and an illuminating device.

2. Description of the Related Art

Recently, with respect to a display device, in place of a CRT (Cathode Ray Tube), a light-emitting-type plasma display panel or a non-light-emitting-type liquid crystal display device has been popularly used.

Out of these display devices, the liquid crystal display device uses a liquid crystal panel as a transmissive dimming element, and includes an illuminating device (also referred to as a backlight) which irradiates light to the liquid crystal panel on a back surface the liquid crystal panel. The liquid crystal panel forms an image by controlling transmissivity of light irradiated from the backlight.

One of the technical features of the liquid crystal display device lies in that the liquid crystal display device can be made thin compared to a CRT. Recently, there has been a demand for a liquid crystal display device with a further decreased thickness. Further, recently, with the advent of a backlight or an illuminating device which uses an LED (Light Emitting Diode) as a light source, there has been a demand for a thin illuminating device.

In view of such circumstances, for example, JP 2009-110811 A and JP 2009-32664 A disclose a technique on a side backlight in which an LED (Light Emitting Diode) is used as a backlight light source, the backlight light source is arranged on a side of a liquid crystal panel instead of a back surface of the liquid crystal panel, and light is irradiated from the back surface of the liquid crystal panel using a light guide plate.

By shortening a distance between the light guide plate and the light source, it is possible to enhance light utilization efficiency of the illuminating device (backlight). However, the light guide plate is warped or thermally expanded and hence, it is difficult to set the distance between the light guide plate and the light source to a value lower than a certain level. Accordingly, there has been a drawback that the further enhancement of the light utilization efficiency of the backlight is difficult.

SUMMARY OF THE INVENTION

It is an object of the present invention to enhance the light utilization efficiency of a liquid crystal display device or an illuminating device.

(1) According to one aspect of the present invention, there is provided a liquid crystal display device including: a light guide plate which includes a front surface, a back surface and a side surface which connects a periphery of the front surface and a periphery of the back surface; a casing which is arranged to face the side surface in an opposed manner with a distance away from the side surface of the light guide plate; a light source unit which is arranged between the side surface of the light guide plate and the casing or between the side surface of the light guide plate and a wall surface which is connected to the casing with a distance away from the casing or the wall surface which is connected to the casing, and allows light to be incident on the side surface of the light guide plate; and a liquid crystal panel which is arranged on the front surface of the light guide plate, wherein the light source unit includes a plurality of light sources and a plurality of light sources substrate to which the light sources are fixed, the light source unit is fixed to the light guide plate in a state where a predetermined distance is held from the side surface of the light guide plate, the side surface of the light guide plate includes a first side surface which faces the light source unit in an opposed manner, and a second side surface which is directed in a second direction orthogonal to a first direction which is the direction along which the light source unit and the first side surface face each other in an opposed manner, an engaging portion which is engageable with the casing is formed on the second side surface or an edge portion which forms the second side surface, and the engaging portion is configured to allow a change of a distance between the first side surface and the casing due to expansion or shrinkage of the light guide plate while restricting the movement of the light guide plate in the first direction. According to the present invention, the distance between the light source unit and the light guide plate is constant and hence, the light utilization efficiency can be enhanced. Further, even when the light guide plate is expanded, due to the presence of a gap between the light guide plate and the casing, it is possible to prevent the light source unit and the casing from coming into contact with each other.

(2) As an example of the present invention, in the liquid crystal display device having the constitution (1), fixing of the light source unit to the light guide plate is performed for every one light source or one group of light sources.

(3) According to another aspect of the present invention, there is provided a liquid crystal display device including: a light guide plate which includes a front surface, a back surface and a side surface which connects a periphery of the front surface and a periphery of the back surface; a casing which is arranged to face the side surface in an opposed manner with a distance away from the side surface of the light guide plate; a light source unit which is arranged between the side surface of the light guide plate and the casing with a distance away from the casing, and allows light to be incident on the side surface of the light guide plate; and a liquid crystal panel which is arranged on the front surface of the light guide plate, wherein the light source unit includes a plurality of light sources and a light source substrate to which the light sources are fixed, the light source unit is fixed to the light guide plate in a state where a predetermined distance is held from the side surface of the light guide plate, the light source substrate includes, between the light sources arranged adjacent to each other, a flexible portion which is bendable more easily in the direction that the side surface is bent when the front surface or the back surface of the light guide plate is bent than a portion to which the light source is fixed, the side surface of the light guide plate includes a first side surface which faces the light source unit in an opposed manner, and a second side surface which is directed in the second direction orthogonal to the first direction which is the direction along which the light source unit and the first side surface face each other in an opposed manner, an engaging portion which is engageable with the casing is formed on the second side surface or an edge portion which forms the second side surface, and the engaging portion is configured to allow a change of a distance between the first side surface and the casing due to expansion or shrinkage of the light guide plate while restricting the movement of the light guide plate in the first direction.

According to the present invention, the distance between the light source unit and the light guide plate is constant and hence, the light utilization efficiency can be enhanced. Further, even when the light guide plate is expanded, due to the presence of a gap between the light guide plate and the casing, it is possible to prevent the light source unit and the casing from coming into contact with each other.

(4) As an example of the present invention, in the liquid crystal display device having the constitution (3), the light source substrate is fixed to the light guide plate at a position closer to the portion to which the light source is fixed than the flexible portion.

(5) As an example of the present invention, in the liquid crystal display device having the constitution (1) or (3), the side surface of the light guide plate has the two first side surfaces which are directed in the directions opposite to each other, and the light source unit is arranged on the first side surfaces respectively.

(6) As an example of the present invention, in the liquid crystal display device having the constitution (1), the difference between a distance between the neighboring light sources arranged on the same light source substrate and a distance between the neighboring light sources arranged on the different light source substrates is set smaller than a distance between the first side surface and an edge portion of an area of the liquid crystal panel on which an image is displayed.

(7) As an example of the present invention, in the liquid crystal display device having the constitution (1), the engaging portion is positioned at a center portion of the second side surface in the longitudinal direction.

(8) As an example of the present invention, in the liquid crystal display device having the constitution (1), the liquid crystal display device includes a drive means which drives the light sources individually or for every specified group of light sources, and the integer number of light source groups which are groups of light sources are arranged on the light source substrate.

(9) As an example of the present invention, in the liquid crystal display device having the constitution (8), the plurality of light source groups are provided, and the number of light sources is equal among the respective light source groups.

(10) As an example of the present invention, in the liquid crystal display device having the constitution (8), the plurality of light source groups are provided, and the number of light source groups is equal among the respective light source substrates.

(11) As an example of the present invention, in the liquid crystal display device having the constitution (1) or (2), through holes are formed in the light source substrate in a penetrating manner, and the light sources are inserted into the through holes so that light is incident on the light guide plate through the through holes.

(12) As an example of the present invention, in the liquid crystal display device having the constitution (1), the light source substrate has a portion which is formed of layers consisting of, in order from a side close to the side surface of the light guide plate, a resin layer, a substrate line layer formed of a metal foil and an insulation layer.

(13) As an example of the present invention, in the liquid crystal display device having the constitution (1), the layer constitution of the light source substrate is constituted of, in order from a side close to the side surface of the light guide plate, a resin layer, a substrate line layer which is formed of a metal foil, an insulation layer, and a metal plate which constitutes a heat radiation member.

(14) As an example of the present invention, in the liquid crystal display device having the constitution (1), a portion which projects in the normal direction of the incident surface of the side surface on which light is incident is formed on the incident surface, and the portion constitutes a member which controls a distance between the light source and the light guide plate.

(15) As an example of the present invention, in the liquid crystal display device having the constitution (1), the difference among a distance between the neighboring light sources arranged on the same light source substrate, a distance between the neighboring light sources arranged on the different light source substrates, and a distance between the neighboring light sources with a portion projecting in the normal direction of the incident surface present on the incident surface is set smaller than a distance between the first side surface and an edge portion of an area of the liquid crystal panel on which an image is displayed.

(16) As an example of the present invention, in the liquid crystal display device having the constitution (1), the light source substrate includes a metal plate, and a portion of the metal plate extends parallel to an incident surface which is the side surface allowing light to be incident on the light guide plate, and is sandwiched between a surface of the light source substrate on a light guide plate side and the light guide plate.

(17) As an example of the present invention, in the liquid crystal display device having the constitution (1), the casing has a metal portion, and a heat radiation member which thermally connects the light source substrate and the metal portion is provided.

(18) As an example of the present invention, in the liquid crystal display device having the constitution (1), a rectangular pedestal which projects in the direction toward at least one of the front surface and the back surface is arranged at a position of the light guide plate corresponding to a position of the light source.

(19) According to still another aspect of the present invention, there is provided an illuminating device including: a light guide plate which includes a front surface, a back surface and a side surface which connects a periphery of the front surface and a periphery of the back surface; a casing which is arranged to face the side surface in an opposed manner with a distance away from the side surface of the light guide plate; and a light source unit which is arranged between the side surface of the light guide plate and the casing or between the side surface of the light guide plate and a wall surface which is connected to the casing with a distance away from the casing or the wall surface which is connected to the casing, and allows light to be incident on the side surface of the light guide plate; wherein the light source unit includes a plurality of light sources and a light source substrate to which the light sources are fixed, the light source unit is fixed to the light guide plate in a state where a predetermined distance is held from the side surface of the light guide plate, the side surface of the light guide plate includes a first side surface which faces the light source unit, and a second side surface which is directed in the second direction orthogonal to the first direction which is the direction along which the light source unit and the first side surface face each other in an opposed manner, an engaging portion which is engageable with the casing is formed on the second side surface or an edge portion which forms the second side surface, and the engaging portion is configured to allow a change of a distance between the first side surface and the casing due to expansion or shrinkage of the light guide plate while restricting the movement of the light guide plate in the first direction. According to the present invention, the distance between the light source unit and the light guide plate is constant and hence, the light utilization efficiency can be enhanced. Further, even when the light guide plate is expanded, due to the presence of a gap between the light guide plate and the casing, it is possible to prevent the light source unit and the casing from coming into contact with each other.

(20) As an example of the present invention, in the liquid crystal display device having the constitution (19), fixing of the light source unit to the light guide plate is performed for every one light source or one group of the light sources.

(21) As an example of the present invention, in the liquid crystal display device having the constitution (19), the side surface of the light guide plate has the two first side surfaces which are directed in the directions opposite to each other, and the light source unit is arranged on the first side surfaces respectively.

(22) As an example of the present invention, in the liquid crystal display device having the constitution (1), the light source substrate is fixed to the light guide plate by an adhering means; at least a portion of the layer constitution of the light source substrate at a predetermined position is constituted of, in order from a side close to the side surface of the light guide plate, a first insulation layer, a substrate line layer which is formed of a metal foil at a position remoter from the side surface than the first insulation layer, and a second insulation layer which is formed at a position remoter from the side surface than the substrate line layer, and the first insulation layer is thicker than the second insulation layer, and the predetermined position is disposed between the light source and the light source.

(23) As an example of the present invention, in the liquid crystal display device having the constitution (1), the plurality of light source substrates are provided.

(24) As an example of the present invention, in the liquid crystal display device having the constitution (19), the light source substrate is fixed to the light guide plate by an adhering means; at least a portion of the layer constitution of the light source substrate at a predetermined position is constituted of, in order from a side close to the side surface of the light guide plate, a first insulation layer, a substrate line layer which is formed of a metal foil at a position remoter from the side surface than the first insulation layer, and a second insulation layer which is formed at a position remoter from the side surface than the substrate line layer, and the first insulation layer is thicker than the second insulation layer, and the predetermined position is disposed between the light source and the light source.

BRIEF DESCRIPTION OF THE DRAWINGS

FIG. 8A to FIG. 8D are views for explaining a third embodiment;

FIG. 16A to FIG. 16C are views for explaining drawbacks to be solved by the present invention.

DETAILED DESCRIPTION OF THE INVENTION

Hereinafter, embodiments of the present invention are explained in conjunction with drawings and the like.

Hereinafter, the content of the present invention is explained in more detail in conjunction with specific embodiments. The embodiments explained hereinafter are merely specific examples of the content of the present invention and hence, the present invention is not limited to these embodiments and those who are skilled in the art can make various changes and modifications without departing from the technical concept disclosed in this specification.

First Embodiment

Figure 1:
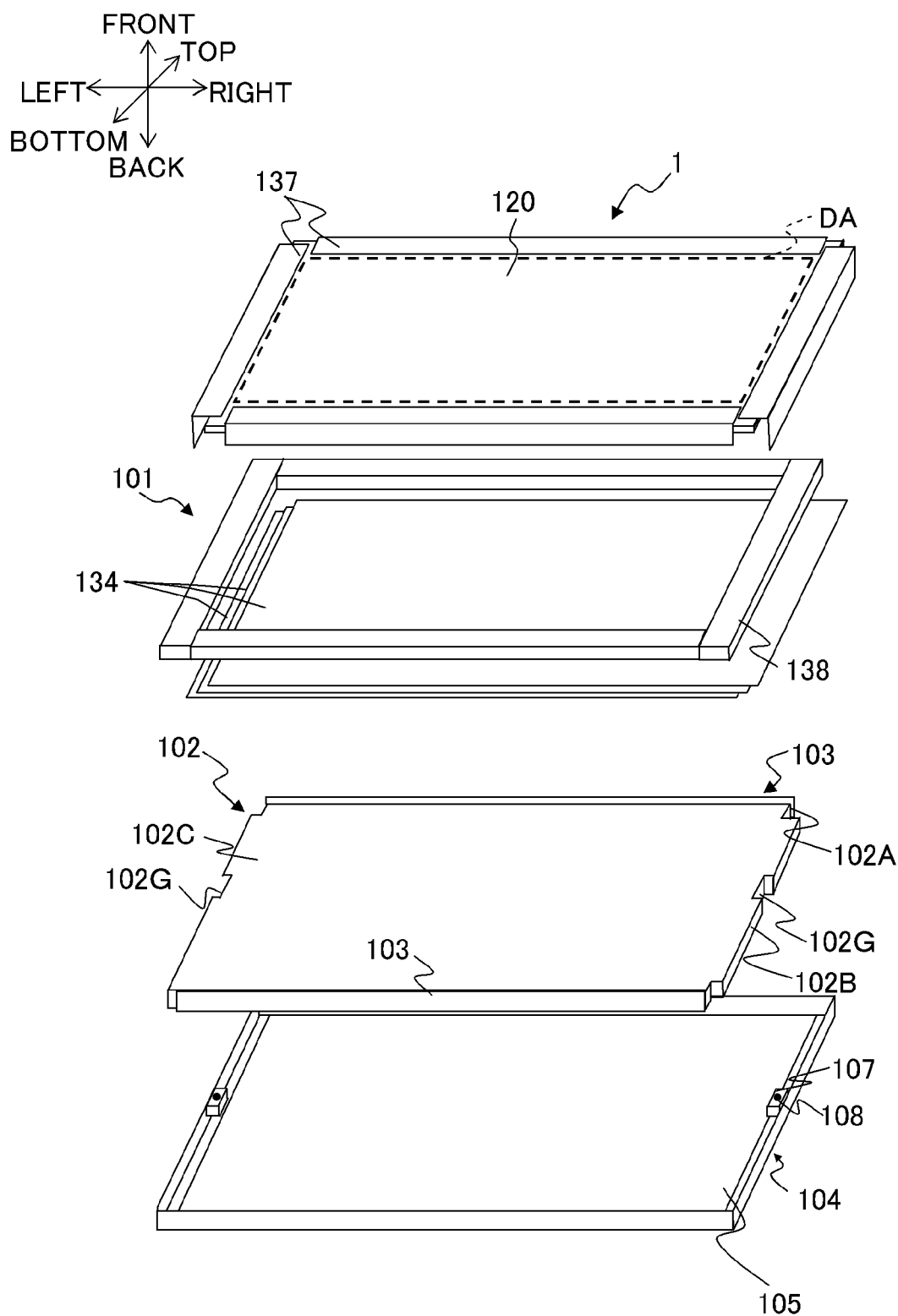
FIG. 1 is a perspective view showing the constitution of an illuminating device according to a first embodiment and a liquid crystal display device which uses the illuminating device as a backlight.
Figure 2A:
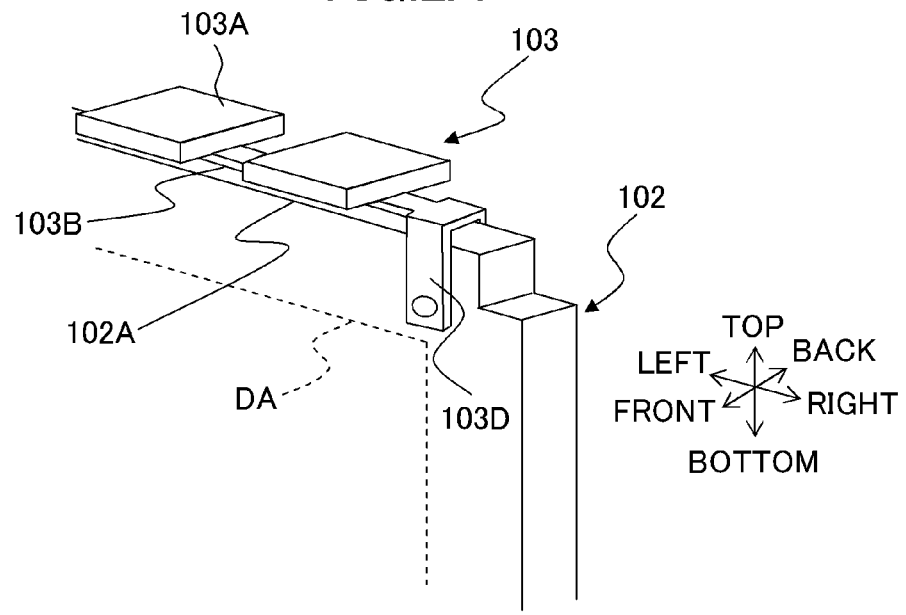
FIG. 2A to FIG. 2C is a view showing the detail of an area around a portion where a light guide plate and a light source unit of the illuminating device according to the embodiments of the present invention are fixed.
Figure 2B:
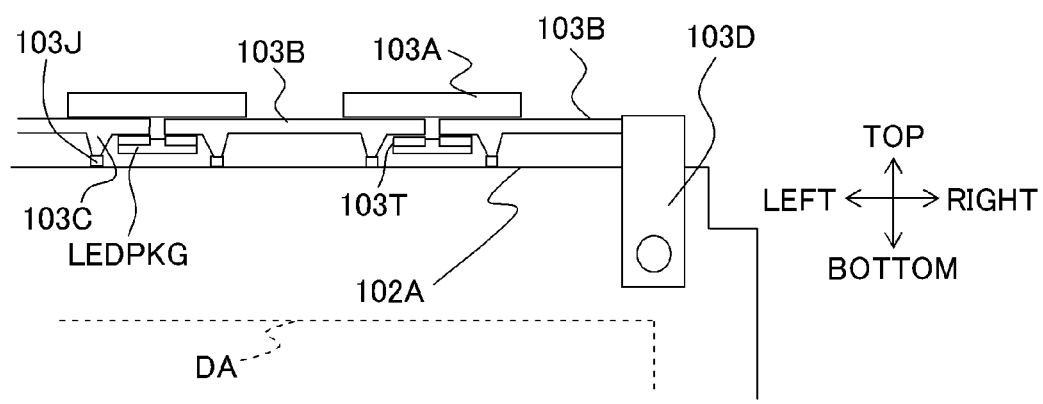
Figure 2C:
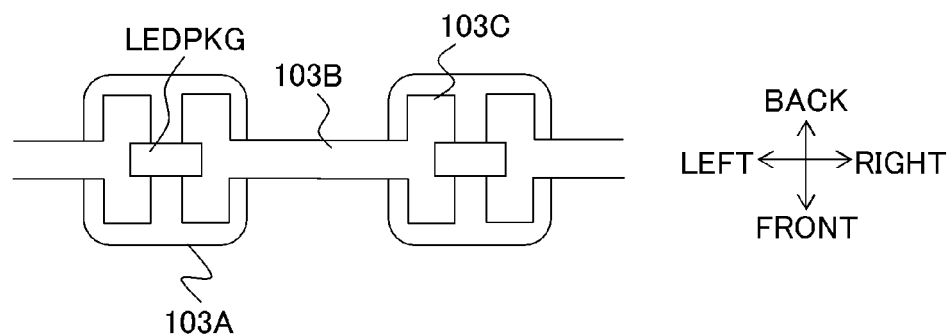
Figure 3A:
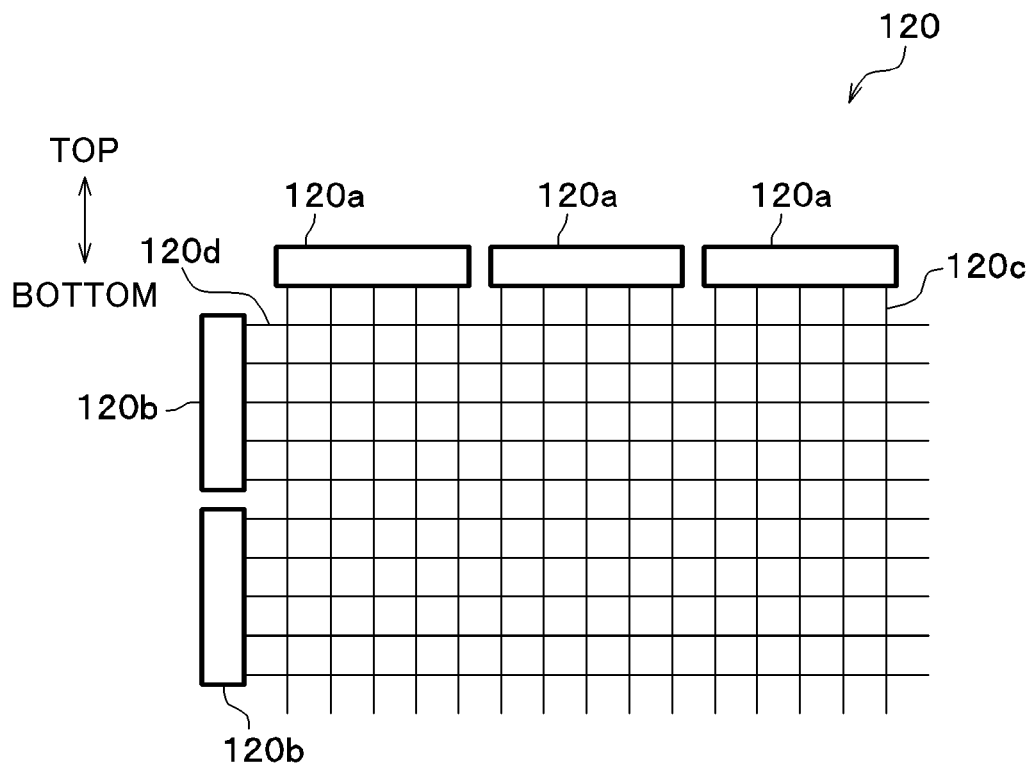
FIG. 3A is a view showing the line on a liquid crystal panel and the arrangement of drive circuits.
Figure 3B:
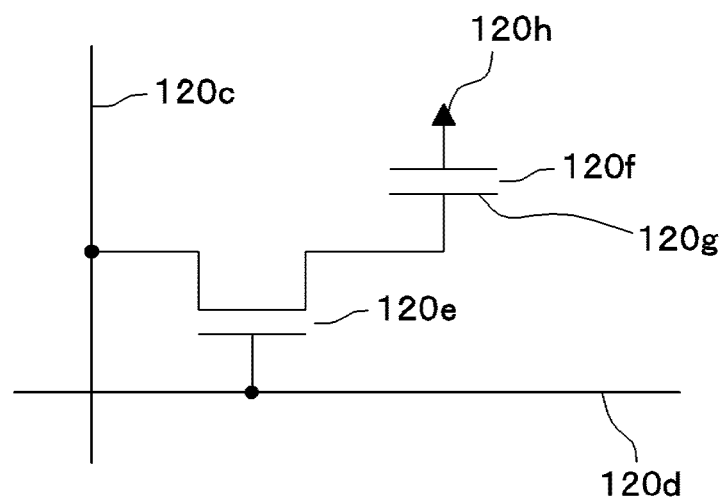
FIG. 3B is a view showing the arrangement of a TFT (Thin Film Transistor) and a pixel electrode.

FIG. 1 is a perspective view showing the constitution of an illuminating device according to this embodiment and a liquid crystal display device 1 which uses such an illuminating device as a backlight 101, and is also a schematic view roughly showing the arrangement of constitutional members. The detailed shapes of the respective members are explained where such explanation is necessary. FIG. 2A to FIG. 2C are views showing the detail of an area around a portion where a light guide plate 102 and a light source unit 103 of the illuminating device are fixed. FIG. 3A is a view showing the line on a liquid crystal panel and the arrangement of drive circuits, and FIG. 3B is a view showing the arrangement of a TFT (Thin Film Transistor) and a pixel electrode.

In this embodiment, as shown in FIG. 1, a top side, a bottom side, a left side, a right side, a front surface and a back surface are defined with reference to a display screen of a liquid crystal panel 120. The left-and-right direction is the direction parallel to the long-axis direction of the liquid crystal panel 120, and the top-and-bottom direction is the direction parallel to the short-axis direction of the liquid crystal panel 120. The directions parallel to the normal direction of the display screen of the liquid crystal panel 120 are the front direction and the back direction and are referred to as the front-and-back direction. In an actual use environment, the front side is assumed as a side where a viewer of a TV (liquid crystal display device of this embodiment) is present, and the top direction is assumed as a direction along which the TV (liquid crystal display device of this embodiment) extends upwardly. The explanation of this embodiment is made hereinafter using these definitions.

As shown in FIG. 1, the liquid crystal display device 1 according to this embodiment is constituted of the liquid crystal panel 120 and the backlight 101, and the liquid crystal panel 120 is fixed to the backlight by an upper frame 137. The backlight 101 irradiates light to the liquid crystal panel 120 from a back side. The liquid crystal panel 120 displays a desired image on a front surface of the liquid crystal panel 120 by controlling transmissivity of light irradiated from the backlight 101. On the front surface of the liquid crystal panel 120, an area where an image is displayed due to a control of transmissivity is assumed as a display area DA.

The backlight 101 includes the light guide plate 102 and LED packages LEDPKG on each of which one or a plurality of LEDs (Light Emitting Diodes) is/are mounted as a light source. The LED package LEDPKG is mounted on the light source unit 103, and the light source unit 103 is fixed to the light guide plate 102. The light guide plate 102 is made of a transparent resin such as an acrylic resin, and has a plurality of side surfaces which are contiguous with an irradiation surface 102C and a function of converting lights (point light sources) irradiated from the LEDs into a surface light source.

An optical sheet 134 is an optical member which controls the distribution of angle of light irradiated from the light guide plate 102 or the like. An intermediate frame 138 is a structural member which is fixed to a lower frame 104 which constitutes a casing for accommodating the optical sheet 134, the light guide plate 102 and the like, and sandwiches the liquid crystal panel 120 between the intermediate frame 138 and the upper frame 137. The casing may have a box shape and may be formed by working a metal plate such as an iron plate or by molding a resin, for example. Further, the casing may be constituted of a plurality of members. For example, the casing may be formed by mounting resin-made side surfaces which surrounds a light guide plate on a metal plate.

The rough position of the display area DA is indicated by a dotted line on a surface of the liquid crystal panel 120 shown in FIG. 1. Although the display area DA is defined by a range in the liquid crystal panel 120 within which pixels to be driven are arranged, the display area DA starts from a position which retracts inwardly (in the direction toward the center of the liquid crystal panel 120) away from an edge of the intermediate frame 138 by several mm within an opening portion surrounded by the intermediate frame 138.

In this embodiment, two side surfaces, that is, top and bottom side surfaces of the light guide plate 102 constitute incident surfaces 102A. Light irradiated from the LED packages LEDPKG is incident on the light guide plate 102 through the incident surfaces 102A, the light guided by the light guide plate 102 is reflected by a light takeout means, and the light is irradiated from the irradiation surface 102C. The light takeout means is provided in such a manner that the light takeout means extends inwardly from a position which is disposed outside the display area DA by several mm. As the light takeout means, various means such as the fine structure, white color scattering dots and a method in which scattering materials are dispersed in a light guide plate are considerable. When a scattering body such as the white color scattering dots is adopted as the light takeout means, it is possible to acquire an advantageous effect that the incident light can be spread in such a manner that the incident light is also diffused in the left-and-right direction (the direction parallel to the incident surfaces 102A). When the fine structure is imparted to the surface of the light guide plate, it is possible to control the incident light in various manners including a control where, although the incident light is allowed to spread in the left-and-right direction, the incident light is also guided in the top-and-bottom direction (the normal direction of the incident surface 102A) while suppressing the spreading of the incident light in the left-and-right direction (the direction parallel to the incident surface 102A) to some extent. For example, by driving light sources for every specific group of light sources, it is possible to perform so-called local dimming in which dimming is performed for every predetermined area by irradiating light to a predetermined area of the light guide plate. The number of light sources in the group of light sources may be one or plural. Hereinafter, the group of light sources may be also referred to as the light source group. An illuminating device which performs the dimming for every predetermined area or a liquid crystal display device which uses such an illuminating device has the constitution which drives predetermined light source groups independently. The light source group is constituted of one light source or a mass of a plurality of light sources which are collectively controlled, and each light source group can be independently controlled. Further, also when the scattering body such as the white color scattering dots are used as the light takeout means, it is possible to perform local dimming by controlling the distribution of density of the white color scattering dots. Further, by performing a transmissivity control of a liquid crystal panel and a control of light sources for every group of light sources in an interlocking manner based on display image data, it is possible to realize the low power consumption and a high-quality image. For example, an area of a backlight which corresponds to an area of a liquid crystal panel where a dark image is displayed is darkened, and the transmissivity of the liquid crystal panel which corresponds to the area is increased. Further, by performing a control of the light emission or non light emission of light sources in synchronism with the driving of scanning lines, it is possible to acquire an advantageous effect that a moving picture performance of a liquid crystal display device is enhanced or an advantageous effect that crosstalk which occurs at the time of displaying a 3D image by displaying an image for a right eye and an image for a left eye with time division can be suppressed. Crosstalk at the time of displaying a 3D image occurs due to a phenomenon that an image for a right eye and an image for a left eye appear in a superposed manner because the response of liquid crystal is slow. Accordingly, it is possible to suppress crosstalk by turning off an area of the backlight corresponding to an area where the liquid crystal responds. In general, scanning lines of the liquid crystal display device extend in the left-and-right direction and are arranged parallel to each other in the top-and-bottom direction and hence, the direction that the scanning lines are sequentially scanned becomes the top-and-bottom direction (the detail of the scanning operation being explained in conjunction with FIG. 3). By making timing at which the scanning lines are scanned and timing at which the light source emits light or does not emit light differ from each other depending on a position, and by driving the light source in synchronism with scanning, it is possible to acquire the above-described advantageous effects. For example, when a light source unit is arranged on a top-side surface and a bottom-side surface of a light guide plate, it is possible to acquire advantageous effects by making timing of light emission or non light emission different between the light sources on a top side and light sources on a bottom side and by driving the light sources in synchronism with the scanning lines divided in two, that is, into the top-side scanning lines and the bottom-side scanning lines.

The liquid crystal panel is explained in conjunction with FIG. 3A and FIG. 3B. The liquid crystal panel 120 has the constitution where liquid crystal is sandwiched between two glass substrates and functions as an optical shutter which controls the transmission/interruption of light irradiated from the light guide plate 102 by controlling an orientation state of liquid crystal molecules which constitute liquid crystal.

As shown in FIG. 3A, in the liquid crystal panel 120, signal lines 120c and scanning lines 120d are arranged in a matrix array, and the liquid crystal panel 120 includes signal line drive circuits 120a for driving the signal lines 120c and scanning line drive circuits 120b for driving the scanning lines 120d.

Further, as shown in FIG. 3B, a TFT 120e which drives liquid crystal 120f is connected to a lattice point between the signal line 120c and the scanning line 120d. The TFT 120e, when a positive voltage is applied to the scanning line 120d, makes the signal lines 120c and a pixel electrode 120g conductive with each other. Here, a voltage corresponding to image data is applied to the pixel electrode 120g from the signal lines 120c, and a shutter of the liquid crystal 120f is opened or closed corresponding to a voltage between the pixel electrode 120g and a counter electrode 120h. When the shutter of the liquid crystal 120f is opened, the liquid crystal 120f allows light irradiated from the irradiation surface 102C of the light guide plate 102 shown in FIG. 1 to pass therethrough so that the pixel becomes a bright pixel. When the shutter of the liquid crystal 120f is not opened, the pixel becomes a dark pixel.

The relationship between the opening/closing of the shutter of the liquid crystal 120f and a voltage applied to the liquid crystal (≈voltage between the pixel electrode 120g and the counter electrode 120h) depends on a so-called display mode of the liquid crystal 120f. In one example of a display mode of the liquid crystal panel 120 for a television receiver set used in general (see FIG. 1), the pixel becomes a bright pixel when an absolute value of a voltage applied to the liquid crystal 120f is large (approximately 5 V), and the pixel becomes a dark pixel when the absolute value of the voltage applied to the liquid crystal 120f is small (approximately 0 V). Here, in the voltage between 0 V and 5 V, although the voltage is nonlinear, the larger the absolute value, the brighter the pixel becomes. Accordingly, by properly zoning a range from 0 V to 5V, it is possible to perform a gradation display. It is needless to say that the present invention is not limited to these display modes.

Further, when a negative voltage is applied to the scanning line 120d connected to the TFT 120e, a high-resistance state takes place between the signal line 120c and the pixel electrode 120g so that a voltage applied to the liquid crystal 120f is held.

In this embodiment, as described above, the liquid crystal 120f is controlled based on the voltages applied to the scanning line 120d and the signal line 120c respectively.

The scanning line drive circuit 120b has a function of performing scanning such that a predetermined voltage is applied to one of the scanning lines 120d at a predetermined cycle sequentially in a descending order, for example. Further, the signal line drive circuit 120a applies a voltage corresponding to respective pixels connected to the scanning line 120d to which a predetermined voltage is applied to each signal line 120c by the scanning line drive circuit 120b.

Due to such a constitution, it is possible to set the bright pixels and the dark pixels using the scanning line 120d to which the voltage is applied. Then, by controlling voltages which the signal line drive circuit 120a applies to the respective signal lines 120c along with scanning by the scanning line drive circuit 120b, it is possible to set the bright pixels and the dark pixels with respect to all scanning lines 120d thus forming an image on the liquid crystal panel 120.

The signal line drive circuit 120a and the scanning line drive circuit 120b may be controlled by a control device (not shown in the drawing), for example.

Although not shown in the drawing, the liquid crystal display device 1 also includes a control device which controls the liquid crystal display device 1, and a drive part having a DC/DC power source or the like which supplies a power source voltage to the backlight 101. The control device is a device which controls the liquid crystal panel 120, the backlight 101 and the like, and performs image processing of an image to be displayed by the liquid crystal display device 1. The control device is, for example, constituted of a computer provided with a CPU (Central Processing Unit), a RAM (Random Access Memory), a ROM (Read Only Memory) and the like not shown in the drawing, programs, peripheral circuits and the like, and the control device is driven by the programs stored in the ROM.

For example, the control device has a function of managing an image signal to be displayed on the liquid crystal panel 120 as information on contrast for every liquid crystal 120f (see FIG. 3B). Then, the control device may control the scanning line drive circuit 120b so as to make the scanning line drive circuit 120b perform scanning such that a predetermined voltage is applied to one of the scanning lines 120d sequentially in a descending order, and may control the signal line drive circuit 120a such that a predetermined voltage is applied to each signal line 120c corresponding to information on contrast from the signal line 120c on the scanning line 120d to which the predetermined voltage is applied. Further, for example, by allowing the control device to perform the transmissivity control of the liquid crystal panel and the control of the light sources for every group of light sources in an interlocking manner based on a display image data, so-called local dimming is performed so that the low power consumption and the high quality image can be achieved.

Here, the drawback that the present invention intends to solve is explained in detail. FIG. 16A to FIG. 16C show a specific example of an illuminating device for explaining the drawback that the present invention intends to solve. That is, the present invention aims at the further enhancement of efficiency by overcoming the drawback of the specific example.

The constitution shown in FIG. 16A is explained. FIG. 16A is a cross-sectional view in the front-and-back direction and in the top-and-bottom direction. An L-shaped heat radiation member 103Q for radiating heat is fixed to the lower frame 104 constituting a casing for housing the light guide plate 102 and the like. The heat radiation member 103Q is formed by extrusion or press forming using a metal material such as aluminum or iron. The light source unit 103 is fixed to the heat radiation member 103Q by screwing or using a pressure-sensitive adhesive double coated heat-conductive sheet (heat conductive rubber or the like). Although a plurality of modes are considered as a preferred mode of the light source unit 103, here, the light source unit 103 which is formed by mounting the LED package LEDPKG on a metal substrate is shown as an example. The metal substrate may have the layered constitution consisting of, for example, a metal plate 103R having a thickness of approximately 1 mm, an insulation film 103S (having a thickness of less than 0.5 mm), a copper foil not shown in the drawing (having a thickness of approximately 35 μm), and a reflection resist not shown in the drawing (having a thickness of less than 20 μm). A heat conductive sheet (including a heat conductive elastic body such as heat conductive rubber) may be sandwiched between the metal plate 103R and the heat radiation member 103Q and between the lower frame 104 and the heat radiation member 103Q.

Since the light guide plate 102 is made of a resin, the light guide plate 102 is subjected to the deformation of shape such as the thermal expansion, a warp or waviness due to a change in an environmental temperature and moisture. When the environmental temperature is changed from a room temperature to approximately 60° C., for example, a light guide plate having a diagonal length of not less than 32 inches is elongated by approximately 2 to 3 mm in the top-and-bottom direction and by approximately 3 to 4 mm in the left-and-right direction by thermal expansion. To consider that the liquid crystal display device is stored in a warehouse at the time of transportation of products or the like, it is preferable to expect a case where the environmental temperature is 60° C. It is more preferable to expect a case where the environmental temperature becomes approximately 70° C. by taking a margin. When the light source unit 103 is fixed to the lower frame 104 constituting the casing as shown in FIG. 16A (by way of the heat radiation member 103Q in the drawing), to prevent the collapse of the LED package LEDPKG by pressing attributed to the elongation of the light guide plate 102, it is necessary to ensure a gap G1 of approximately 1 mm between the light guide plate 102 and the LED package LEDPKG. Due to the presence of the gap G1, there exists a problem that some of light emitted from the LED package LEDPKG does not impinge on an incident surface 102A of the light guide plate 102 and becomes a stray light resulting in a loss of light. When a diagonal length of the illuminating device is not more than approximately 20 inches, the gap G1 is sufficiently small so that it is unnecessary to pay particular attention to the loss of light. However, when it comes to a large-sized television receiver set where a diagonal length of the illuminating device exceeds 32 inches, the gap G1 is large so that the loss of light is a serious problem which influences the power consumption. The gap G1 is approximately 1 mm in a case of the large-sized television receiver set where a diagonal length of the illuminating device exceeds 32 inches, for example, so that the influence of the gap G1 exerted on the illuminating device is large affecting the power consumption.

The specific example shown in FIG. 16A is a case where a width W1 of a light emitting area of the LED package LEDPKG (slightly smaller than a width of an LED package LEDPKG by approximately 0.05 to 1 mm) is set to approximately one half to ¾ of a width of the incident surface 102A. That is, the width W1 is approximately 2 to 3 mm and a thickness of the light guide plate 102 is approximately 4 mm. The specific example shown in FIG. 16B is a case where the width W1 is set to approximately 0.5 to 3 mm and the thickness of the light guide plate 102 is approximately 2 mm. That is, FIG. 16B shows the case where both the thickness and the width W1 of the light guide plate 102 are not more than 3 mm. By setting the thickness of the light guide plate 102 to 4 mm, the probability that light emitted from the LED package LEDPKG impinges on the incident surface 102A is increased so that the light utilization efficiency (a rate of quantity of light irradiated from the illuminating device (backlight) with respect to light emitted from the LED package LEDPKG or, from a viewpoint of convenience a rate of quantity of light irradiated from an irradiation surface 102C of the light guide plate or the optical sheet 134) is increased. However, to take the reduction of an environmental load brought about by the decrease of thickness, the decrease of weight and the decrease of quantity of material to be used of the light guide plate 102 into consideration, it is desirable to make the thickness of the light guide plate 102 as small as possible. In making the light guide plate 102 thin, it may be also possible to make the width W1 small. However, in a case of the light guide plate used in a large-sized television receiver set having a diagonal size of 32 inches or more, to acquire a large quantity of light, it is considered that the width W1 is limited to approximately 0.5 mm. In any case, the smaller the thickness of the light guide plate 102, the more the light utilization efficiency is lowered also attributed to the drawback explained next.

The decrease of thickness of the light guide plate 102 also causes an additional drawback. This drawback is brought about by a warp of the light guide plate 102. FIG. 16C shows an example of the warp of the light guide plate 102. The light guide plate 102 may be formed into a convex shape on a front side or on a back side due to the warp. When the warp occurs as shown in FIG. 16C, the center of the width W1 and the center of the light guide plate 102 in the thickness direction are displaced from each other partially. The thinner the light guide plate 102 becomes, the larger a rate at which a quantity of light which does not impinge on the incident surface 102A of the light guide plate with respect to light emitted from the LED package LEDPKG (a rate of a quantity of light with respect to the total emitted light) becomes and hence, the lowering of the light utilization efficiency attributed to the displacement between the center of the width W1 and the center of the light guide plate 102 in the thickness direction becomes large. Further, the thinner the light guide plate 102 becomes, the more the incident surface is liable to be bent (waved) in the long side direction of the incident surface of the light guide plate and hence, the light utilization efficiency is liable to be lowered. When the thickness of the light guide plate 102 is equal to or less than the width W1 or not more than 3 mm, the lowering of light utilization efficiency is conspicuous.

One of the objects of the present invention lies in the suppression of the lowering of light utilization efficiency attributed to the above-mentioned elongation, warp and waviness caused by the thermal expansion of the light guide plate 102.

The constitution which can suppress the lowering of light utilization efficiency attributed to the above-mentioned elongation, warp and waviness caused by the thermal expansion of the light guide plate 102 is explained in conjunction with FIG. 1 and FIG. 2.

In FIG. 1, an engaging portion 102G which fixes the light guide plate 102 to the casing is formed on side surfaces 102B (hereinafter referred to as fixing surfaces) of the light guide plate perpendicular to the side surfaces (incident surfaces 102A) of the light guide plate 102 which face the light source substrates in an opposed manner. This constitution is provided for allowing the light guide plate 102 to be elongated in the normal direction of the incident surface 102A (top-and-bottom direction in the drawing) with reference to the engaging portion 102G when the light guide plate 102 is thermally expanded. Further, when the light guide plate 102 is thermally expanded so that the incident surfaces 102A are moved, since the light source units 103 are fixed to the light guide plate 102 such that a distance between the incident surface 102A of the light guide plate 102 and the LED package LEDPKG which constitutes the light source is not changed, the position of the LED package LEDPKG is also changed along with the change of the position of the incident surface 102A of the light guide plate 102 (see FIG. 2, the detail of the structure being explained later). A gap which allows the elongation of the light guide plate 102 is present between the light source unit 103 and the lower frame 104 which constitutes the casing.

The engaging portion 102G is formed on the fixing surfaces 102B on both sides at a position where distances from the incident surfaces are approximately equal. Due to such a constitution, the movement of the incident surfaces 102A due to thermal expansion of the light guide plate 102 is carried out in a state where the incident surfaces 102A are parallel to each other. This structure also suppresses the generation of a torque which tends to rotate the light guide plate 102 in plane parallel to the irradiation surface 102C and the generation of a stress which cannot be released with the simple structure. This embodiment adopts the constitution which releases the elongation attributed to thermal expansion in the top-and-bottom direction and the left-and-right direction. Accordingly, to allow the elongation of the light guide plate 102 due to thermal expansion also in the left-and-right direction, a gap is also formed between a fixing block 107 and the engaging portion 102G.

Although the engaging portion 102G is described as a rectangular notch in FIG. 1, the engaging portion 102G is not particularly limited to such a shape, and the engaging portion 102G may be formed of a semicircular or semi-elliptical notch, for example. Further, a hole (for example, a circular hole, an elliptical hole or the like) is formed on a light guide plate 102 side as the engaging portion 102G, and a pin 108 which is connected to the casing as the fixing block 107 may be inserted into the hole. In other words, the engaging portion 102G is formed on the fixing surface 102B or on a portion along the fixing surface 102B outside the display area DA of the liquid crystal panel 120 (a portion within an approximately 20 mm from the fixing surface 102B). Further, the engaging portion 102G is formed such that the engaging portion 102G becomes the reference when the light guide plate 102 is thermally expanded in the normal direction of the incident surface.

The combination of the fixing surface 102B and the engaging portion 102G and the fixing block 107 may take various constitutions. Fundamentally, it is sufficient provided that such combination has a shape or the constitution by which the light guide plate 102 can be fixed to the constitutional member which constitutes the casing. Here, it is preferable that the light guide plate 102 is allowed to be elongated due to thermal expansion also in the left-and-right direction such that a gap is provided between the engaging portion 102G and the fixing block 107.

Further, in FIG. 1, the engaging portion 102G is positioned at a center portion of the fixing surface 102B in the longitudinal direction. This constitution allows the light guide plate 102 to be thermally expanded uniformly in the top-and-bottom direction and hence, a gap between the lower frame 104 which constitutes the casing and the light source unit 103 can be set approximately equal at top and bottom sides. In performing the structural design of a space in which the light guide plate 102 is arranged, the space is designed symmetrically in the top-and-bottom direction and hence, the design can be simplified thus giving rise to an advantageous effect that the productivity is enhanced due to shortening of a design period. The gap between the lower frame 104 and the light source unit 103 defines a margin which allows the elongation of the light guide plate 102.

Further, when the thermal distribution of the light guide plate 102 becomes asymmetrical, it is sufficient to determine the positions of the engaging portions 102G corresponding to the asymmetric heat distribution. For example, when the number of light sources is equal between upper and lower sides of the light guide plate 102, upon operation of the liquid crystal display device 1, a temperature of an upper side of the light guide plate 102 becomes higher than a temperature of a lower side of the light guide plate 102 due to the natural convection. In such a case, it is sufficient to arrange the engaging portions 102G on an upper side above a center portion of the fixing surface 102B in the longitudinal direction.

Further, for example, when the number of light sources differs between the upper and lower sides of the light guide plate 102, and the light sources are arranged with high density on the lower side of the light guide plate 102 or the light sources are arranged on only the lower side of the light guide plate 102, it is sufficient to arrange the engaging portion 102G on a lower side below the center portion of the fixing surface 102B in the longitudinal direction so that the light guide plate is elongated in the top direction. The reason that the light sources are arranged on the lower side of the light guide plate 102 with high density is that heat is moved from the lower side to the upper side so that the lower side is liable to be easily cooled.

The asymmetry of the heat distribution becomes conspicuous when the liquid crystal display device 1 is operated. When an environmental temperature becomes 60° C. in storing the liquid crystal display device 1 in a warehouse, for example, at the time of transporting the liquid crystal display device 1 as a product, the whole light guide plate 102 assumes a temperature substantially equal to the environmental temperature and is elongated uniformly. In determining the positions of the engaging portions 102G, such determination may be selectively made based on which one of the emphasis should be placed between the thermal expansion which occurs when the liquid crystal display device 1 is operated and the thermal expansion which occurs when the environmental temperature becomes high each time the decision is made.

By fixing the light source unit 103 to the light guide plate 102 and by forming the engaging portion 102G which fixes the light guide plate 102 to the casing on the side surfaces of the light guide plate 102 perpendicular to the side surfaces of the light guide plate 102 which face the light surface substrate in an opposed manner, it is possible to release the elongation of the light guide plate 102 due to the thermal expansion in the top-and-bottom direction with reference to the engaging portions 102G. Further, since the light source unit 103 is fixed to the light guide plate 102, even when a distance between the LED package LEDPKG which constitutes the light source and the light guide plate 102 is decreased as much as possible, provided that a sufficient gap is provided between the light source unit 103 and the lower frame 104 which constitutes the casing, it is possible to eliminate a possibility that the light source unit 103 is sandwiched between the light guide plate 102 and the lower frame 104 so that the light source unit 103 is broken. By adopting the constitution of this embodiment, a distance between the LED package LEDPKG which constitutes the light source and the light guide plate 102 can be decreased as much as possible and hence, a probability that light emitted from the LED packages LEDPKG is incident on the light guide plate 102 is increased so that this embodiment can acquire an advantageous effect that light utilization efficiency can be enhanced.

The detail of a method of fixing the light source unit 103 to the light guide plate 102 is explained in conjunction with FIG. 2A to FIG. 2C. The constitution for suppressing the lowering of light utilization efficiency which occurs due to the displacement between the center of the light emitting surface of the LED package LEDPKG and the center of the light guide plate in the thickness direction attributed to a warp of the light guide plate 102 in the front-and-back direction shown in FIG. 16C or waviness of the light guide plate 102 is also explained in conjunction with FIG. 2A to FIG. 2C.

FIG. 2A is a perspective view showing the constitution of the light source unit 103 and the light guide plate 102, FIG. 2B is a view showing the light source unit 103 and the light guide plate 102 as viewed from a front side, and FIG. 2C is a view of the light source unit 103 arranged on an upper side of the light guide plate 102 as viewed from below. The LED package LEDPKG is mounted on a light source substrate 103A, and the light source unit 103 includes a plurality of light source substrates 103A. The light source substrates 103A are mechanically and electrically connected to each other using a connecting line 103B. The connecting line 103B is, on the light source substrate 103A, connected to a substrate line 103C on which the LED package is mounted. With respect to a shape of the substrate line 103C, the substrate line 103C includes a portion which projects in the normal direction of the incident surface 102A (hereinafter, referred to as a projecting portion of the substrate line 103C), and a planar portion which is arranged parallel to the light source substrate 103A (hereinafter, referred to as a planar portion of the substrate line 103C), and the LED package LEDPKG is mounted on the planar portion of the substrate line 103C. Further, an LED may be directly mounted on the substrate line 103C by wire bonding and the LED may be packaged with a resin.

The substrate line 103C is adhered to the light source substrate 103A by an adhering means such as an adhesive material. The projecting portion of the substrate line 103C is fixed to the light guide plate 102 using a fixing member (adhering means) such as an adhering material 103J or a double-coated adhesive material. Accordingly, the light source substrate 103A including the LED package LEDPKG is fixed to the light guide plate 102 by way of the substrate line 103C. Due to the projecting portion of the substrate line 103C, the positional relationship between the LED package LEDPKG and the incident surface 102A of the light guide plate is held at a fixed value so that there exists no possibility that the LED package LEDPKG is broken whereby it is possible to suppress the lowering of the light utilization efficiency attributed to the displacement between the center of the light emitting surface of the LED package LEDPKG and the center of the light guide plate in the thickness direction. Further, a distance between the LED package LEDPKG and the incident surface 102A of the light guide plate can be set to a short distance, that is, 0.5 mm or less and hence, it is also possible to enhance the light utilization efficiency. Here, the projecting portion of the substrate line 103C also plays a role of a reflector which reflects light from the LED package LEDPKG and allows the light to be incident on the light guide plate 102. It is often the case that light which advances in the left-and-right direction from the LED package LEDPKG is turned into stray light and disappears and hence, by allowing light to be reflected on the projecting portion of the substrate line 103C and to be incident on the light guide plate 102, it is possible to enhance the light utilization efficiency.

Further, end portions of the light source unit 103 in the left-and-right direction are fixed to the light guide plate 102 by light source unit fixing portions 103D. Various methods may be adopted as a method of fixing the light source unit 103. For example, considered is a method in which a through hole is formed in the light guide plate 102 at a predetermined position, a threaded hole is formed on the light source unit fixing portion 103D, and the light source unit 103 and the light guide plate 102 are fixed to each other using a bolt one size smaller than the through hole. The reason the bolt one size smaller than the through hole is used is that it is possible to make the light source unit fixing portion 103D movable with respect to the thermal expansion in the left-and-right direction.

The light source substrate 103A is formed of a substrate having a thickness of 0.1 mm or more, is preferably formed of a substrate having a thickness of 1 mm or more, and is preferably formed of a hard and non-warping substrate. As a material of the light source substrate 103A, a resin such as a glass epoxy resin may be preferably used, for example. The reason why the resin is preferably used is that the resin has insulation property and is light in weight. To prevent the generation of a warp in the light source substrate 103A, a shape of the light source substrate 103A is preferably a square. This is because light source substrate 103A having a square shape can prevent the LED package LEDPKG from being broken due to a warp of the light source substrate 103A.

Further, the smaller the width W1 of the light emitting surface of the LED package LEDPKG becomes, the more advantageously the light utilization efficiency is enhanced and hence, there may be a case where a rectangular LED package LEDPKG having short sides of a width W1 shown in FIG. 2C is used.

Soldering-use electrode pads 103T are formed so as to divide the LED package LEDPKG in two (an anode electrode pad and a cathode electrode pad) in the longitudinal direction (see FIG. 2B), and the LED package LEDPKG is mounted on the substrate line 103C by soldering by way of the electrode pads. Such a constitution brings about an advantageous effect that an area of the electrode pads can be increased so that heat from the LED can be easily radiated to the substrate line 103C due to the heat conduction.

With respect to a shape of the connecting line 103B which is arranged on the upper side of the light guide plate 102, as viewed from the incident surface 102A side (bottom direction) of the light guide plate, a width of the connecting line 103B is set smaller than a width of the light source substrate 103A as shown in FIG. 2C. Accordingly, the connecting line 103B is gently bendable in the front direction and the back direction (front-and-back direction). Accordingly, when the light guide plate 102 is warped in the front-and-back direction, the deformation in shape of the light guide plate 102 is not absorbed by the light source substrate 103A but is absorbed by the connecting line 103B. That is, in this embodiment, the LED package LEDPKG is mounted on the hard light source substrate 103A, and the LED packages LEDPKG are connected by the connecting line which is bendable more easily than the light source substrate. Accordingly, it is possible to provide a flexible light source unit which can suppress the breaking of the LED package LEDPKG. The connecting line 103B may be formed using various materials and, for example, is formed by working metal such as copper, aluminum, or iron. By working copper, the projecting portion and the planar portion of the substrate line 103C and the connecting line 103B may be formed as a lead frame. Copper has a red luster and hence, it is preferable that surfaces of the above-mentioned components other than a surface of the electrode pad 103T are covered with a reflection resist or the like for preventing the absorption of blue.

In this embodiment, the light source substrate 103A is fixed to the light guide plate 102, and the light source substrate 103A moves following the elongation of the light guide plate 102 due to the thermal expansion. Further, the light source substrate 103A on which the LED package LEDPKG is mounted is a hard substrate and is divided in two, and the light source substrate 103A follows a warp and waviness of the light guide plate 102 in the front-and-back direction. Due to such a constitution, the positional relationship between the incident surface 102A of the light guide plate and the LED package LEDPKG is not changed so that the lowering of the light utilization efficiency can be suppressed and, at the same time, a distance between the incident surface 102A of the light guide plate and the LED package LEDPKG can be decreased as much as possible and hence, it is also possible to enhance the light utilization efficiency.

Figure 4A:
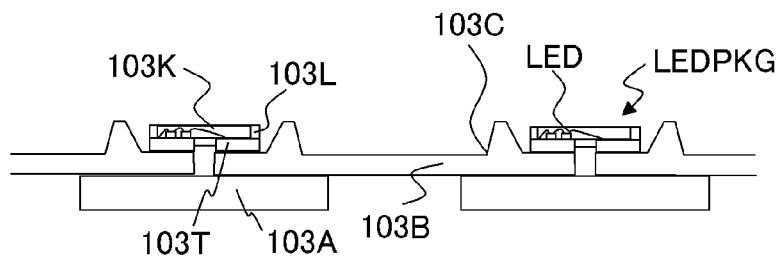
FIG. 4A to FIG. 4E are views for explaining illuminating devices according to the first embodiment and liquid crystal display devices which use the illuminating devices as backlights.
Figure 4B:
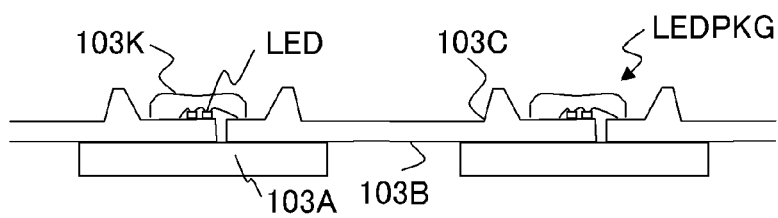
Figure 4C:
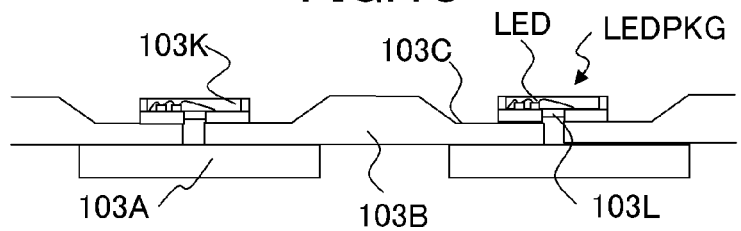
Figure 4D:
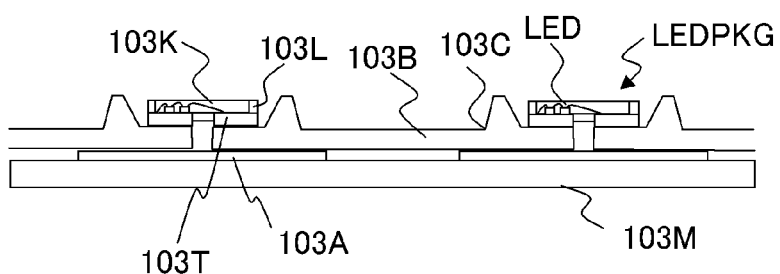

Next, the specific example of the constitution around the LED package LEDPKG of the light source unit 103 is explained in detail in conjunction with FIG. 4A, and modifications of the specific example are explained in conjunction with FIG. 4B to FIG. 4D. All drawings are views as viewed from a front side.

FIG. 4A is a view showing the light source unit 103 shown in FIG. 2 in detail. Two LEDs are arranged on the cathode electrode pad 103T. Two LEDs are connected to each other in series by wire bonding. One of wires of one LED is connected to an anode, and one of wires of the other LED is connected to a cathode. The LEDs are packaged by an LED case 103L using a transparent sealing resin 103K. The LEDs in FIG. 4A are blue LEDs. That is, FIG. 4A shows a white LED package LEDPKG which generates a white light by mixing a phosphor which generates a yellow light with blue light excitation or by mixing a phosphor which generates a green light with blue light excitation and a phosphor which generates a red light with blue light excitation into the sealing resin 103K. Here, it is needless to say that the present invention can acquire advantageous effects explained in this specification without depending on colors of light emitted from the LEDs, phosphors contained in the LED packages LEDPKG, the number of LEDs and the like, and also irrelevant to shapes, the constitutions and the structure of the light source and the LED package LEDPKG. For example, the LED package LEDPKG may be formed of an LED package which includes an LED which emits a red light, an LED which emits a blue light or an LED which emits a green light. Also LED package LEDPKG may be formed of an LED package which includes an LED which emits an ultraviolet light.

[Modification 1]

FIG. 4B is a view showing the constitution where LEDs are directly mounted on a substrate line 103C by wire bonding and the LEDs are packaged with a resin. The LEDs are arranged on a cathode substrate line 103C. The sealing resin 103K which packages the LEDs has a lens shape (a portion directly above the LED is recessed) which spreads light in the left-and-right direction (in the direction along the longitudinal direction of the light source unit) and hence, even when a distance between the LED packages LEDPKG is increased, display irregularities are not generated. It is more preferable to use a lens which focuses light toward an incident surface with respect to the front-and-back direction because a large quantity of light impinges on the incident surface of the light guide plate so that the light utilization efficiency is also enhanced. For arranging the LED at the center of the lens, a planar portion of the substrate line 103C is more elongated toward a cathode side than a planar portion on an anode side. Here, a mode of mounting the lens is not limited to the above-mentioned mode, and the lens may be provided to the LED package LEDPKG. The constitution explained in conjunction with this modification 1 can decrease materials for mounting the LED package LEDPKG compared to a case where the LED package LEDPKG is mounted on the light source substrate 103A so that an environmental load can be decreased.

[Modification 2]

FIG. 4C is a view showing the constitution where projecting portions of a substrate line 103C are formed on a connecting line 103B, wherein the connecting line 103B has a large thickness in the top-and-bottom direction. The modification 2 provides the structure which can acquire advantageous effects that strength of the connecting line 103B is increased while maintaining flexibility of the connecting line 103B when bent in the front-and-back direction.

[Modification 3]

FIG. 4D is a view showing the constitution where a connection heat radiation member 103M is provided as a heat radiation member, wherein the connection heat radiation member 103M is a member which mechanically connects the light source substrates 103A to each other and, at the same time, diffuses heat from the light sources. The connection heat radiation member 103M is formed such that the connection heat radiation member 103M is gently bent in the front-and-back direction at a position corresponding to the connecting line 103B (a position corresponding to an area between the light source substrate and the light source substrate). For example, the connection heat radiation member 103M may be formed such that the connection heat radiation member 103M is made narrow at a position corresponding to the connecting line 103B compared to other positions. Further, to accelerate the radiation of heat, it is further preferable to provide a fin shape or an aluminum block to the connection heat radiation member 103M at positions corresponding to the light source substrates 103A. Still further, the mechanical strength of the connecting line 103B can be increased with the provision of the connection heat radiation member 103M and hence, a thickness of the light source substrate 103A can be decreased thus enhancing a heat radiation effect from the LED package LEDPKG to the connection heat radiation member 103M. The property of being hard which the light source substrate 103A possesses may be imparted to the connection heat radiation member 103M by adhering the light source substrate 103A to the connection heat radiation member 103M using the light source substrate 103A as an insulation film. In this case, it is necessary to form the connection heat radiation member 103M such that the connection heat radiation member 103M is gently bent in the front-and-back direction at a position corresponding to the connecting line 103B. For example, a width of the connection heat radiation member 103M at a position corresponding to the connecting line 103B may be set smaller than the width of the connection heat radiation member 103M at a position corresponding to the light source substrate 103A.

[Modification 4]

Figure 4E:
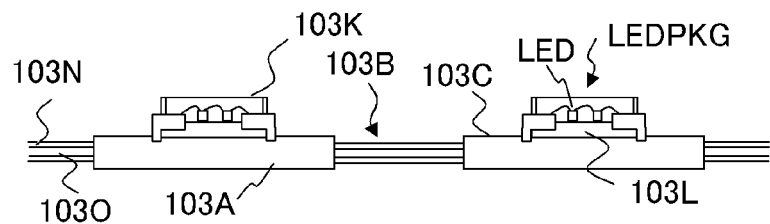

FIG. 4E shows the constitution where a multi-layered substrate is used as the light source substrate 103A, and a connecting line 103B is formed by sandwiching a metal foil (a metal foil 103O) between flexible films (flexible films 103N) made of a resin or the like. As the metal foil 103O, a copper foil or the like can be named, for example. As a material of the flexible film, polyimide or the like can be named, for example. Due to such a constitution, the connecting line 103B is flexible and deflectable thus providing the structure which has the tolerance with respect to the elongation in the left-and-right direction (in the longitudinal direction of the light source unit). In this modification, the light source substrate 103A is not limited to the multi-layered substrate and may be formed of a single-layered substrate.

It is needless to say that the constitutions explained in conjunction with FIG. 4A to FIG. 4E can be used in various combinations.

Hereinafter, modifications of the first embodiment which are made by focusing on the light source unit 103, and particularly on the light source substrate 103A are explained in conjunction with FIG. 5A to FIG. 5E. All drawings are views as viewed from a front side.

[Modification 5]

Figure 5A:
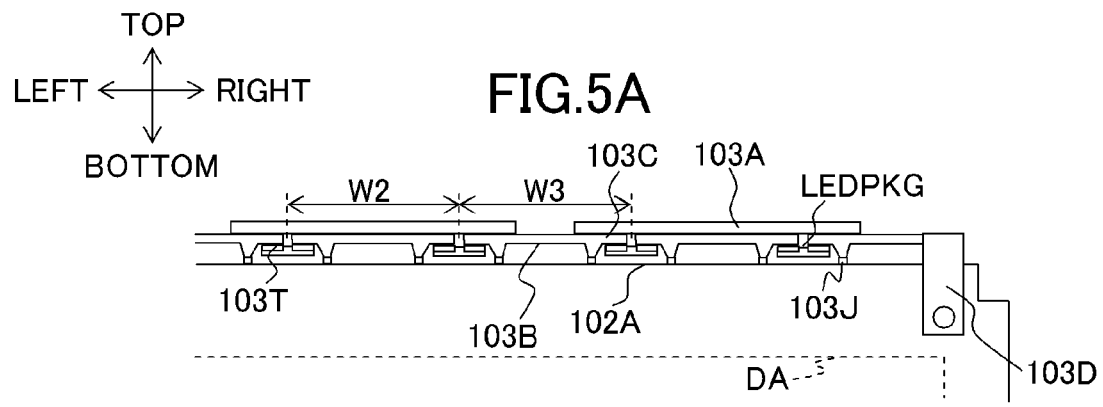
FIG. 5A to FIG. 5E are views for explaining the illuminating devices according to the first embodiment and the liquid crystal display devices which use the illuminating devices as the backlights.

FIG. 5A shows a case where a plurality of (two in the drawing) LED packages LEDPKG are mounted on one light source substrate 103A. On both sides of each LED package LEDPKG, a projecting portion of a substrate line 103C is arranged, and the projecting portions are adhered to the incident surface 102A of a light guide plate by the adhering means 103J (sticking means). It is desirable that a distance W2 between neighboring LED packages LEDPKG arranged on the same light source substrate 103A and a distance W3 between neighboring LED packages LEDPKG arranged on the different light source substrates 103A are equal. It is also desirable that the difference between the distance W2 and the distance W3 is within 2 mm to 5 mm. Further, assuming that a distance between the incident surface 102A and the display area DA as a distance DIA, it is desirable that a distance WE2 between light emitting portions (portions which emit light) of the neighboring LED packages LEDPKG arranged on the same light source substrate 103A and a distance WE3 between the light emitting portions of the neighboring LED packages LEDPKG arranged on the different light source substrates 103A are less than the distance DIA. It is desirable that the difference between the distance WE2 and the distance WE3 is less than the distance DIA, and the distance WE2 and the distance WE3 are equal. The reason is as follows. When the distance W2 and the distance W3 differ from each other, the contrast of brightness appears in a stripe shape on the irradiation surface 102C of the light guide plate 102, and the contrast is detected as display irregularities. An area with the short distance between the neighboring LED packages LEDPKG becomes bright, and an area with the long distance between the neighboring LED packages LEDPKG becomes dark. Here considered is a case where the dimming (so-called local dimming) is performed for every predetermined area of the light guide plate by irradiating light to the predetermined area by driving a light source for every predetermined group. In this case, to prevent light which is introduced into the light guide plate from excessively spreading in the left-and-right direction (in the direction parallel to the incident surface 102A), a lens which converges light in the direction perpendicular to the incident surface 102A is provided to the LED package LEDPKG, an incident surface of the light guide plate is formed into a lens shape, or the fine structure such as fine surface irregularities or grooves is provided to a surface of the light guide plate thus preventing light incident on the light guide plate from excessively spreading in the left-and-right direction (in the direction parallel to the incident surface 102A). The stripe-shaped irregularities are liable to occur in such a constitution and hence, the decrease of the difference between the distance W2 and the distance W3 brings about a large irregularities suppressing effect. Further, assuming an angle of light incident on the light guide plate from a normal line of the incident surface 102A (a refraction angle of the incident light on the incident surface) as a polar angle $\theta_I$, when the light guide plate is formed using a material having a refractive index of approximately 1.5, the maximum angle $\theta_{IM}$ of the refraction angle of the incident light becomes approximately 42 degrees, that is, less than 45 degrees. Due to spreading of the incident light between the incident surface 102A and the display area DA, the stripe-shaped irregularities can be suppressed. The distance which allows the incident light to spread and reach the display area DA is a product of the distance DIA and $\tan \theta_{IM}$. The product of the distance DIA and the $\tan \theta_{IM}$ is approximately the distance DIA when the maximum angle $\theta_{IM}$ is approximately 42 degrees, that is, less than 45 degrees. Accordingly, the distance which allows the incident light from the neighboring LED packages LEDPKG to spread in an overlapping manner thus suppressing display irregularities is obtained when the distance between the light emitting portions of the neighboring LED packages LEDPKG is less than the distance DIA. Further, when the light source is driven for every group, a boundary between predetermined areas which independently perform dimming is set between the light sources. When the distance W2 and the distance W3 differ from each other, between a case where the boundary between the predetermined areas is arranged between the neighboring LED packages LEDPKG arranged on the same light source substrate 103A and a case where the boundary between the predetermined areas is arranged between the neighboring LED packages LEDPKG arranged on the different light source substrate 103A, the positional distribution of brightness in the vicinity of the boundary differs. Accordingly, to consider a case where the transmissivities of the liquid crystal panel at respective positions are controlled in association with the brightness of a backlight, when the positional distribution of brightness in the vicinity of the boundary between the areas differs depending on an area, a transmissivity control algorism at respective positions of the liquid crystal panel becomes more complicated and hence, such distance setting is not desirable. Accordingly, it is desirable that the distance W2 and the distance W3 are equal, and the difference between the distance W2 and the distance W3 is within approximately 2 to 5 mm. Further, as the constitution for fixing the light source unit to the light guide plate, the distance between the LED package LEDPKG and the incident surface of the light guide plate is set so as to arrange the LED package LEDPKG and the incident surface of the light guide plate close to each other and hence, the light emitting positions of the LED packages LEDPKG are easily reflected on the irradiation distribution of light from the irradiation surface of the light guide plate. Accordingly, the display irregularities attributed to the difference between the distance W2 and the distance W3 are liable to occur and hence, it is desirable to decrease the difference between the distance W2 and the distance W3.

The relationship between the distance W2 and the distance W3 and the effects explained in conjunction with the modification 5 are also applicable to the structure where a light source unit is constituted of a plurality of light source substrates and a plurality of LED packages LEDPKG are mounted on the light source substrate.

[Modification 6]

Figure 5B:
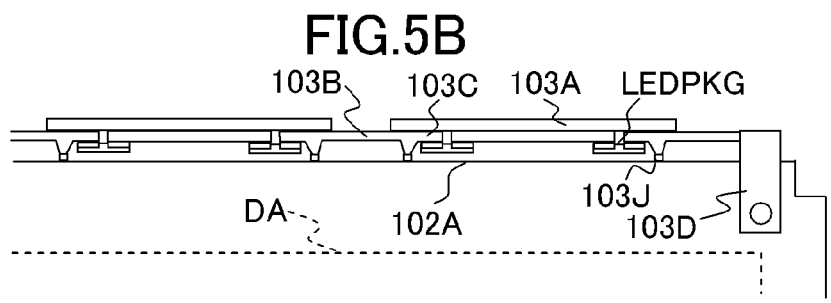

FIG. 5B shows the constitution where the number of the projecting portions of the substrate line 103C is decreased compared to a case in FIG. 5A, and the number of portions where the source substrate 103A is fixed to the light guide plate 102 is decreased. In the drawing, the light source substrates 103A are fixed to the light guide plate 102 by projecting portions of the substrate line 103C arranged at positions corresponding to end portions of the light source substrates 103A. By properly reducing the number of fixing portions, the mounting of the light source unit 103 can be easily performed at a manufacturing stage.

[Modification 7]

Figure 5C:
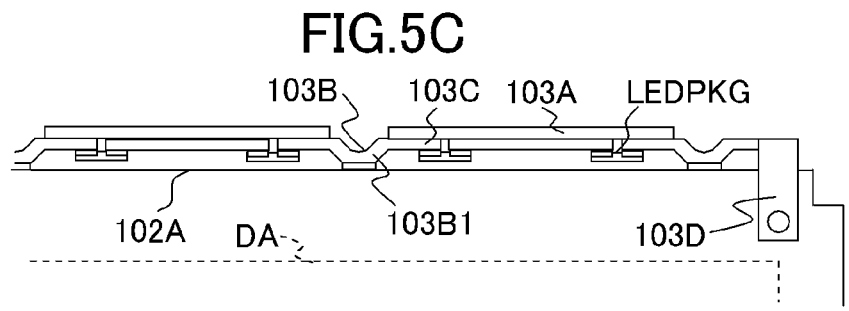

FIG. 5C shows the constitution where the substrate line 103C is formed of only a planar portion, and a projection 103B1 is formed by bending the connecting line 103B. The projection has a function of preventing an LED package LEDPKG from coming into contact with alight guide plate 102, and also has a function of fixing the light source unit 103 to the light guide plate 102. Due to such a constitution, a thickness of the continuous line becomes constant. Accordingly, working for changing the thickness of the line can be

Embodiment 8

Figure 5D:
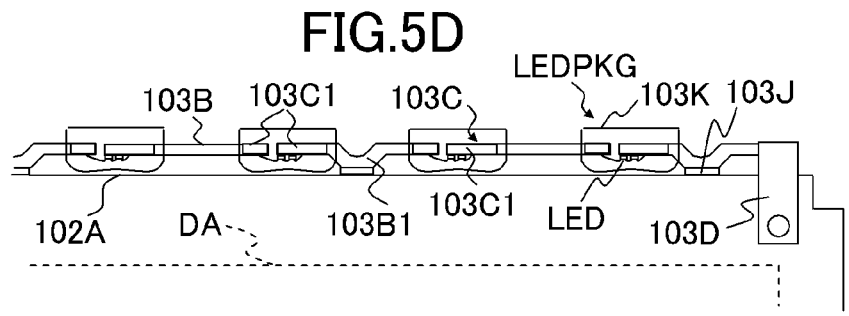

FIG. 5D shows the constitution where LEDs are directly mounted on a line (substrate line 103C) and are packaged with a resin (sealing resin 103K), and LED packages LEDPKG and the line are integrally formed with each other. The substrate line 103C which constitutes the line portion on which the LEDs are mounted has a portion (103C1) whose width in the front-and-back direction is larger than a width of the connecting line 103B which connects the LED packages LEDPKG to each other so that the portion 103C1 is hard and plays a role of the light source substrate 103A by being packaged with a resin. It is preferable to increase the thickness of the portion 103C1 since the increase of the thickness make the portion 103C1 harder. In other words, by forming the portion 103C1 whose width in the front-and-back direction is larger than the width of the connecting line 103B and by packaging the whole substrate line 103C which has the portion 103C1 with a resin so as to cover the whole portion 103C1, the packaged portion constitutes a portion which exhibits the strong resistance against a stress such as a warp and hence, the LED package LEDPKG of this modification plays not only a role of the light source but also the light source substrate 103A. Accordingly, this modification provides the constitution which can realize the concept of this embodiment that the light source is allowed to follow a warp and waviness of the light guide plate by mounting the LEDs on the hard portion in a stable manner and by gently bending the light source unit 103 at the flexible portion (connecting line 103B).

Further, the LED package LEDPKG can be mounted in a more stable manner by arranging the LED package LEDPKG near a position where the light source unit 103 is fixed to the light guide plate 102. This is because the connecting line 103B1 which has a fixing portion is harder to bend compared to the connecting line 103B which has no fixing portion. It is desirable that a length from the LED package LEDPKG to the fixing portion at the connecting line 103B1 having the fixing portion is shorter than a length from another connecting line 103B of the LED package LEDPKG to the neighboring LED package LEDPKG.

[Modification 9]

Figure 5E:
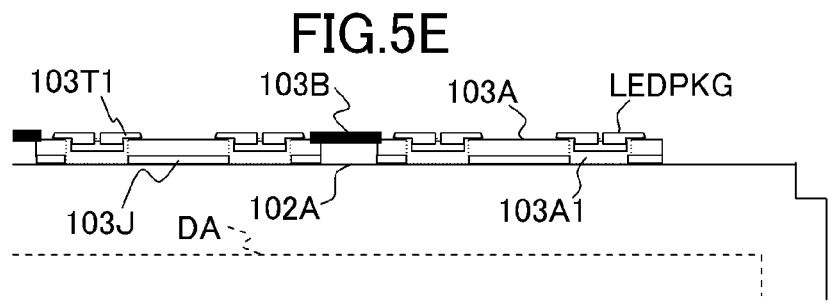

FIG. 5E shows the constitution where a through hole 103A1 is formed in the light source substrate 103A, and the LED package LEDPKG is inserted into the through hole 103A1 so that light is incident on the light guide plate 102 through the through hole 103A1. The light source substrate 103A is fixed to the incident surface 102A of the light guide plate 102 (in the drawing, the light source substrate 103A being fixed using the adhering member 103J, also adhering means such as a tacky member, an adhesive double-coated member such as a pressure-sensitive adhesive double-coated tape being used). Since a surface of the light source substrate 103A is adhered to the incident surface 102A of the light guide plate 102, fixing is made within a wide area thus providing the constitution where the light guide plate 102 and the light source substrate 103A are strongly adhered to each other. Further, the distance between the LED package LEDPKG and the light guide plate 102 is the difference between a thickness of the LED package LEDPKG and a thickness of the light source substrate 103A and hence, the distance can be controlled by adjusting the thickness of the light source substrate 103A. Various structures are considered as the layer structure of the light source substrate 103A. For example, the light source substrate 103A may be formed by laminating a substrate (also used as a core member) which constitutes an insulation layer made of a resin material such as glass epoxy and having a thickness of approximately 0.1 to 1.0 mm, a layer for a substrate line 103C made of a metal foil such as a copper foil, and an insulation layer from an incident surface side, for example. By taking the heat radiation into consideration, a layer such as a metal plate or the like may be mounted on the insulation layer. An adhesion layer (adhesive material) or a tacky adhesive layer (adhesive material) not shown in the drawing may be provided between the respective layers. Due to such a constitution, heat of the LED package LEDPKG is conducted or transferred to the light guide plate 102 through the substrate made of a resin material and hence, heat is hardly transferred compared to the heat transfer through metal or the like whereby the temperature elevation of the light guide plate 102 can be suppressed.

With the constitution of light source substrate explained above, this modification can acquire the following outstanding advantageous effects. That is, in the constitution for fixing the light source substrate to the light guide plate, a strength which brings the light source substrate to the light guide plate into close contact with each other is high and hence, the insulation between the LED package LEDPKG and the light guide plate can be easily ensured, a distance between the LED package LEDPKG and the light guide plate 102 can be also easily controlled, and the heat can be also easily radiated due to the combination of the light source substrate and the heat radiation member.

Further, it is desirable that a member possessing a high reflectance is arranged on an incident surface side of the light source substrate. As such a member, for example, a white reflection sheet, a mirror reflection sheet on which aluminum or silver is vapor-deposited or the like can be named. A reflection resist may be applied to the incident surface side of the light source substrate by coating.

Further, the lead line 103T1 which is led out from the LED package LEDPKG is connected by soldering to the substrate line 103C which is arranged on a back surface of the light source substrate 103A opposite to a surface of the light source substrate 103A which faces the incident surface 102A in an opposed manner.

The light source substrates 103A are connected to each other by a connecting line 103B which is a flexible line. As the connecting line 103B, various lines such as a lead line or an FPC can be named.

In this embodiment, the explanation has been made with respect to the case where the connecting line 103B is formed of the lead line made of the single-layered metal material except for some portions (FIG. 4E, FIG. 5E). However, the connecting line 103B is not limited to such a lead line and may be formed of a multi-layered line. For example, as the connecting line 103B, for example, it is possible to use a multi-layered line which includes a layer (core layer) which connects the light source substrates with a mechanical strength and a conductive layer which has a function of electrically connecting the light source substrates, wherein the conductive layer and the core layer are insulated from each other. In this case, it is preferable that a portion of the multi-layered line which is brought into contact with the light guide plate 102 is electrically insulated from the LED package LEDPKG.

Further, also the substrate line 103C which is connected between the LED packages LEDPKG or to the connecting line 103B on the light source substrate 103A may not be formed of a lead line which is contiguously connected to the connecting line 103B. For example, the substrate line 103C may be formed of a line made of copper foil arranged on a surface of the light source substrate 103A. It is preferable that a surface of the copper foil is covered with a reflection resist except for a contact portion with an electrode. The substrate line 103C is connected to the connecting line 103B by soldering or the like.

It is needless to say that the various constitutions explained in this embodiment can be carried out by properly combining them without departing from the gist of the present invention.

Second Embodiment

Figure 6A:
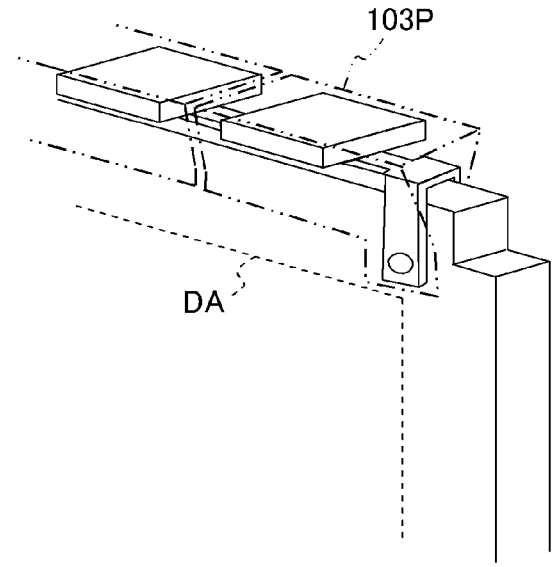
FIG. 6A to FIG. 6C are views for explaining a second embodiment.
Figure 6A:
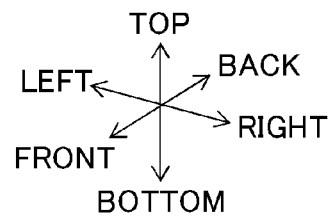
Figure 6B:
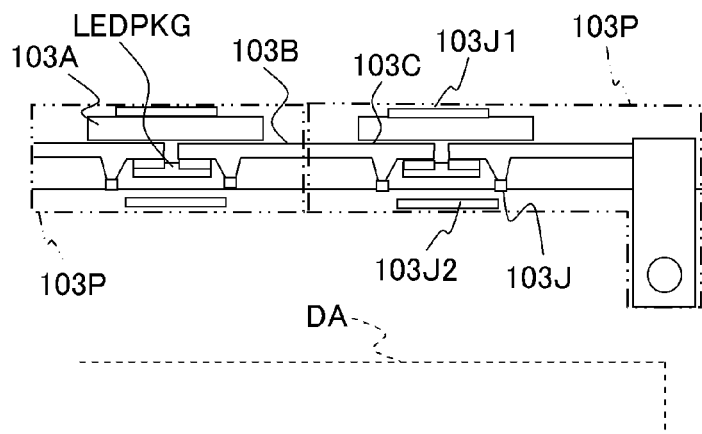
Figure 6B:
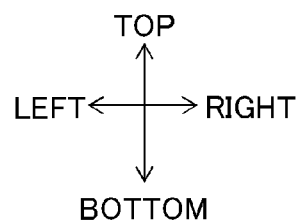
Figure 6C:
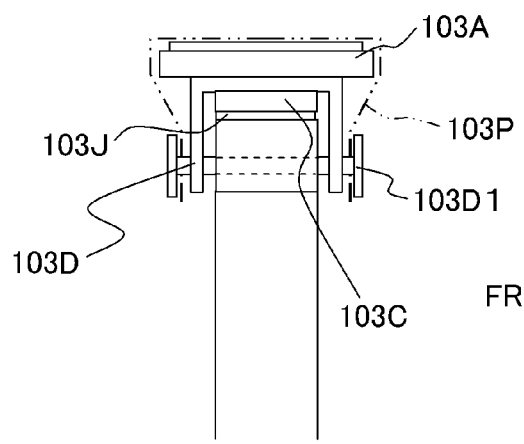
Figure 6C:
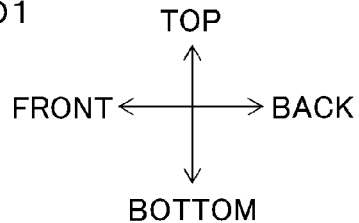

FIG. 6A to FIG. 6C are views showing the constitution of an illuminating device according to the present embodiment and the constitution of the light guide plate 102 and the light source unit 103 used in the liquid crystal display device 1 which uses the illuminating device as the backlight 101, wherein FIG. 6A is a perspective view, FIG. 6B is a plan view as viewed from a front side, and FIG. 6C is a view as viewed from a right side. In this embodiment, the explanation of the constitution which is equal to the constitution explained in conjunction with the first embodiment and shown in FIG. 2 is omitted. A point which makes the second embodiment differ from the first embodiment lies in that a light source reflector 103P is provided to the constitution shown in FIG. 2. The light source reflector 103P is a member having a function of reflecting light irradiated from light sources toward the front-and-back side to the incident surface 102A of the light guide plate, and is arranged corresponding to a side surface of the light source.

The light source reflector 103P is a member which exhibits high reflectivity at a portion thereof corresponding to a light source. For example, as the light source reflector 103P, a white reflection sheet having a scattering reflection property or a mirror reflection sheet made of aluminum or silver can be named. The light source reflector 103P may be a member which is formed by fixing (fixing being made adhesion or using a pin) a reflection sheet or a mirror reflection sheet made of aluminum or silver to a casing made of metal such as aluminum or iron which is formed so as to cover a front side and a back side of the light source may be used. The light source reflector 103P may be a member to which an aluminum film, a silver film or the like is vapor-deposited or a member to which a white paint is applied may be also used. The light source reflector 103P may be a member which is covered with a reflection resist. The light source reflector 103P may be a member which is a molded product made of a white resin. Further, the light source reflector 103P may be a member which is formed by applying the above-mentioned high reflective member such as a reflection sheet to a resin member.

To allow the light source reflector 103P to gently bend conforming to a warp of the light guide plate 102, the light source reflector 103P is divided into plural pieces along a corresponding incident surface of the light guide plate 102. In the drawing, the light source reflector 103P is divided such that the divided light source reflector 103P corresponds to each light source substrate 103A. The light source reflector 103P which corresponds to each light source substrate 103A is fixed to a back surface of the light source substrate 103A and front and back surfaces of the light guide plate 102 outside a display area DA. In the drawing, the light source reflector 103P is adhered to the back surface of the light source substrate 103A and the front and back surfaces of the light guide plate 102 outside the display area DA using adhering members 103J1, 103J2 (or a tacky material such as a double-sided adhesive tape). Further, at left and right end portions of the light source unit, the light source reflector 103P is fixed together with a light source unit fixing portion 103D by a light source unit fixing member 103D1 such as bolts or rivets. Further, the light source reflector 103P may be fixed to the light guide plate 102 in such a manner that a cutaway portion is formed on the fixing surface 102B of the light guide plate 102, a fixing column such as a pin is formed on the light source reflector 103P, and the light source reflector 103P is fixed using the cutaway portion and the column. As shown in the drawing, to enhance the light utilization efficiency, positions where the light source reflector 103P is divided are set at positions where the light source reflector 103P does not overlap with the LED package LEDPKG which constitutes the light source and overlaps with the connecting line 103B.

It is desirable to form the light source reflector 103P using a metal material such as an aluminum plate because the light source reflector 103P can also acquire a heat radiation function due to the heat diffusion so that the light source reflector 103P also functions as a heat radiation member. In this case, it is preferable to apply a reflection sheet or the like made of a resin to a light source side of the aluminum plate because the insulation is established between the connecting line 103B and the light source reflector 103P and between the substrate line 103C and the light source reflector 103P. It is preferable to apply a member having high reflectivity to a light source side of the aluminum plate. Further, the number of division of the light source substrate and the number of division of the light source reflector 103P may be different from each other or equal. Still further, the light source reflector 103P may not be divided depending on the material and the structure thereof.

[Modification of Second Embodiment]

Figure 7A:
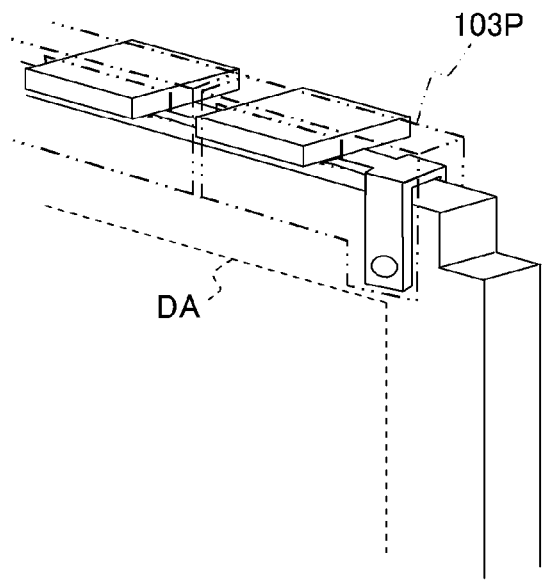
FIG. 7A to FIG. 7C are views for explaining the second embodiment.
Figure 7A:
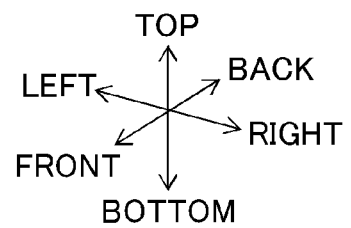
Figure 7B:
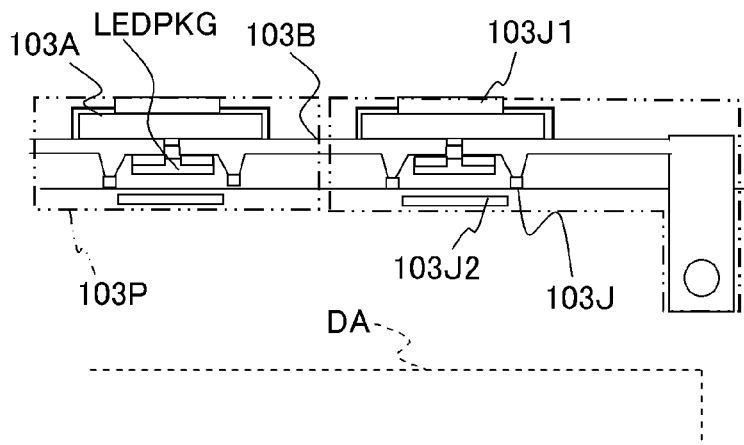
Figure 7B:
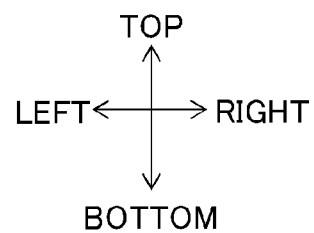
Figure 7C:
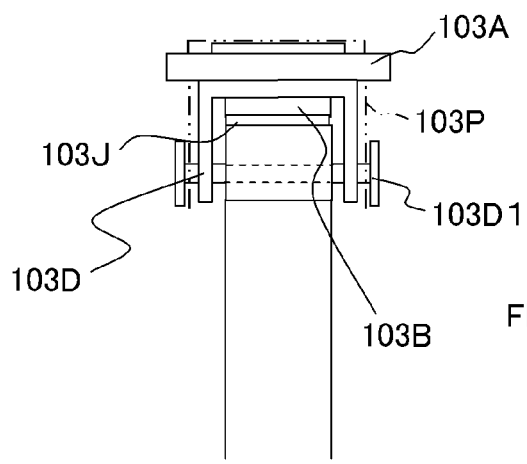
Figure 7C:
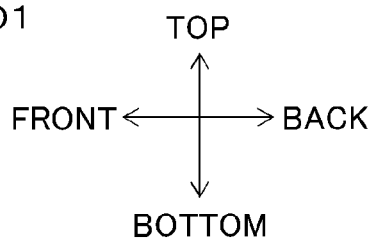

The modification of the light source reflector 103P is explained in conjunction with FIG. 7A to FIG. 7C. By forming holes in the light source reflector 103P at positions corresponding to portions of the light source unit 103 (light source substrate 103A in the drawing) which project in the front-and-back direction1 and by allowing the light source substrate 103A to pass through the holes, the light source reflector 103P can be arranged closer to a side surface of the LED package LEDPKG thus enhancing a function of the light source reflector 103P which reflects light irradiated in the front-and-back direction toward the incident surface 102A of the light guide plate 102. Since the light source reflector 103P is arranged close to the LED package LEDPKG, a larger quantity of light is reflected on the incident surface 102A so that light which leaks as stray light can be decreased thus giving rise to an advantageous effect that the light utilization efficiency is enhanced.

It is needless to say that the various constitutions explained in conjunction with this embodiment can be carried out in proper combinations without departing from the gist of the present invention.

Third Embodiment

FIG. 8A to FIG. 8D are views showing the constitution of an illuminating device according to this embodiment, and the light guide plate 102 and the light source unit 103 which are used in the liquid crystal display device 1 where the illuminating device is used as the backlight 101. In these drawings, FIG. 8A is a perspective view of the constitution, FIG. 8B is a plan view as viewed from a front side of the constitution, FIG. 8C is a plan view as viewed from a right side of the constitution, and FIG. 8D is a view of the light source unit 103 as viewed from a top side. The explanation of the constitution of parts identical with the parts shown in FIG. 2 which are explained in conjunction with the first embodiment is omitted. The constitution of this embodiment differs from the constitution shown in FIG. 2 with respect to a point that, in fixing the light source unit 103, a light source fixing portion 102F which projects in the front-and-back direction (the front direction in the drawing) is mounted on the light guide plate 102, and the light source unit 103 is fixed by hooking a connecting line 103B on the light source fixing portion 102F. In this embodiment, the light source unit 103 is fixed also by a mechanical method in which the connecting line 103B is hooked on the light source fixing portion 102F and hence, the reliability on fixing can be enhanced.

To enable hooking of the connecting line 103B on the light source fixing portion 102F, the connecting line 103B is arranged at a position where the connecting line 103B does not overlap with the light guide plate 102. A hooking portion of the light source fixing portion 102F is formed such that the light source fixing portion 102F extends in the upward direction from the light guide plate 102 and projects in the front-and-back direction. Accordingly, the connecting line 103B has to be arranged at a position where the connecting line 103B does not overlap with (face) the incident surface 102A of the light guide plate 102 in an opposed manner (see FIG. 8C and FIG. 8D).

It is needless to say that the various constitutions explained in conjunction with this embodiment can be carried out in proper combinations without departing from the gist of the present invention.

Fourth Embodiment

Figure 9A:
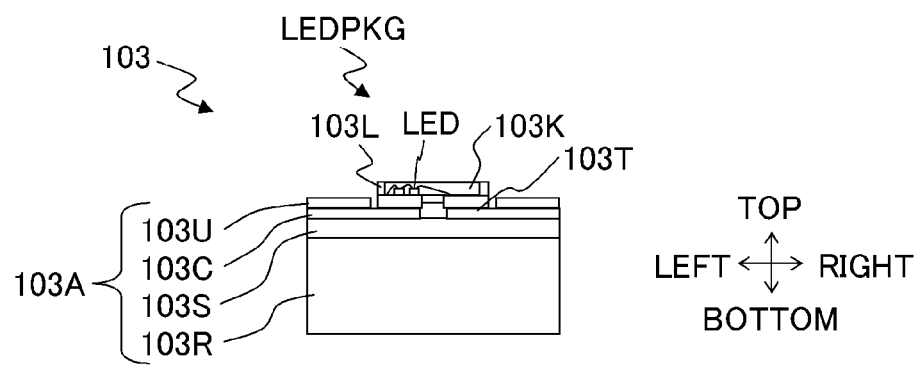
FIG. 9A and FIG. 9B are views for explaining a fourth embodiment.
Figure 9B:
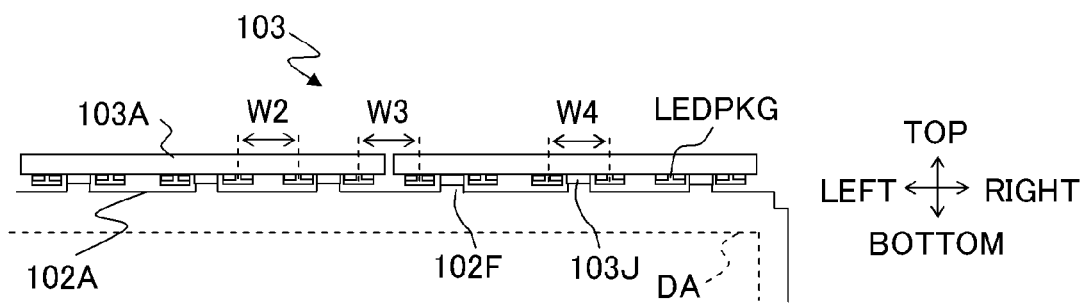

FIG. 9A and FIG. 9B are views showing the constitution of an illuminating device according to this embodiment, and the light source unit 103 which is used in the liquid crystal display device 1 where the illuminating device is used as the backlight 101. In these drawings, FIG. 9A is a detailed plan view of the light source unit 103 as viewed from a front side, and FIG. 9B is a plan view of the light guide plate 102 and the light source unit 103 as viewed from a front side of the constitution.

An LED package LEDPKG shown in FIG. 9A has been explained in conjunction with the first embodiment and hence, the explanation of the LED package LEDPKG is omitted. The light source substrate 103A of this embodiment is formed by laminating an insulation film 103S, the substrate line 103C made of copper foil or the like and a reflection resist 103U on a metal plate 103R made of aluminum, copper, iron or the like. The metal plate 103R is provided since the metal plate 103R functions as a heat radiator and also imparts a mechanical strength to the light source substrate 103A. The substrate line 103C and the metal plate 103R are insulated from each other by the insulation film 1035. Alternatively, a substrate which does not use the metal plate 103R (that is, a substrate which is formed by providing the insulation film 103S having a large thickness and by laminating the substrate line 103C made of copper foil or the like and the reflection resist 103U on a surface of the insulation film 103S in this order).

A light guide plat is provided with the light source fixing portions 102F having a shape projecting in the normal direction of the incident surface 102A (in the top direction in the drawing). The light source unit 103 is fixed to the light source fixing portions 102F. As a method of fixing the light source unit 103, a method which fixes the light source unit 103 by adhesion or by tacky adhesion using an adhesive material or a pressure-sensitive adhesive double-coated tape or a method which allows bolts to penetrate the light source unit 103 from a back surface of the metal plate 103R and fixes the light source unit 103 to the light source fixing portions 102F may be adopted. The light source fixing portions 102F also have a function of preventing LED packages LEDPKG from coming into contact with the incident surface 102A. Accordingly, the light source fixing portion 102F may be used as members which prevent the LED packages LEDPKG from coming into contact with the incident surface 102A, and the light source substrate 103A and the light guide plate 102 may be fixed to each other by adhesion or tacky adhesion using a separately prepared member. Further, by pressing the light source fixing portions 102F to the light source substrate 103A, the light source fixing portions 102F also function as a member which controls the distance between the LED package LEDPKG and the light guide plate 102.

To allow the LED package LEDPKG to follow the bending of the light guide plate 102 in the front-and-back direction, one light source unit 103 for one incident surface 102A is constituted of a plurality of light source substrates 103A thus allowing also the light source unit 103 to bend in the front-and-back direction.

As has been explained in conjunction with the modification 5 of the first embodiment, it is desirable that a distance W2 between neighboring LED packages LEDPKG arranged on the same light source substrate 103A and a distance W3 between neighboring LED packages LEDPKG arranged on the different light source substrates 103A are equal. It is desirable that a distance W4 between neighboring LED packages LEDPKG with the light source fixing portion 102F sandwiched therebetween is also equal to the distance W2 and the distance W3. It is desirable that the difference among the distance W2, the distance W3 and the distance W4 is within 2 mm to 5 mm. Further, assuming that a distance between the incident surface 102A and the display area DA as a distance DIA, it is desirable that a distance WE2 between light emitting portions (portions which emit light) of neighboring LED packages LEDPKG arranged on the same light source substrate 103A, a distance WE3 between light emitting portions of neighboring LED packages LEDPKG arranged on the different light source substrates 103A, and a distance WE4 between light emitting portions of neighboring LED packages LEDPKG with the light source fixing portion 102F sandwiched therebetween are less than the distance DIA. It is desirable that the difference among the distance WE2, the distance WE3 and the distance WE4 is less than the distance DIA, and the distance WE2, the distance WE3 and the distance WE4 are equal. The reason is as follows. When the distance W2, the distance W3 and the distance W4 differ from each other, the contrast of brightness appears on an irradiation surface 102C of the light guide plate 102, and the contrast is detected as display irregularities. An area with the short distance between the neighboring LED packages LEDPKG becomes bright, and an area with the long distance between the neighboring LED packages LEDPKG becomes dark. Here considered is a case where aiming at the so-called local dimming explained in conjunction with the first embodiment in which the dimming is performed for every predetermined area, as a light takeout means, the fine structure is applied to a surface of the light guide plate 102 so as to suppress the spreading of light introduced into the light guide plate 102 in the left-and-right direction (direction parallel to the incident surface 102A) to some extent. In such a case, the stripe-shaped irregularities are liable to occur. Accordingly, the decrease of the difference among the distance W2, the distance W3 and the distance W4 brings about an effect for largely suppressing irregularities. The relationship among the distances W2, W3, W4 and the relationship among the distances WE2, WE3, WE4 which suppress the display irregularities, and the detail of the reason that these relationships are adopted are substantially equal to the matters relating to the relationship among the distances W2, W3 and the relationship among the distances WE2, WE3 in the modification 5 of the first embodiment and hence, the explanation of such relationship and such detail of reason are omitted. Further, by fixing the light source unit to the light guide plate 102, the distance between the LED package LEDPKG and the incident surface of the light guide plate 102 can be set such that the LED package LEDPKG and the incident surface of the light guide plate 102 are arranged close to each other and hence, it is possible to easily reflect the light emitting positions of the LED packages LEDPKG on the irradiation distribution of light irradiated from the irradiation surface of the light guide plate 102. Accordingly, it is desirable to set the distances W2, W3, W4 and the distances WE2, WE3, WE4 to satisfy the above-mentioned relationships.

It is needless to say that the various constitutions explained in conjunction with this embodiment can be carried out by properly combining them without departing from the gist of the present invention.

Fifth Embodiment

Figure 10A:
FIG. 10A to FIG. 10F are views for explaining a fifth embodiment.
Figure 10B:
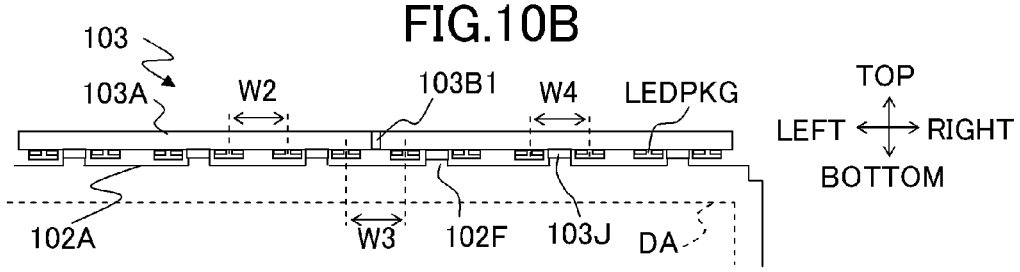
Figure 10C:
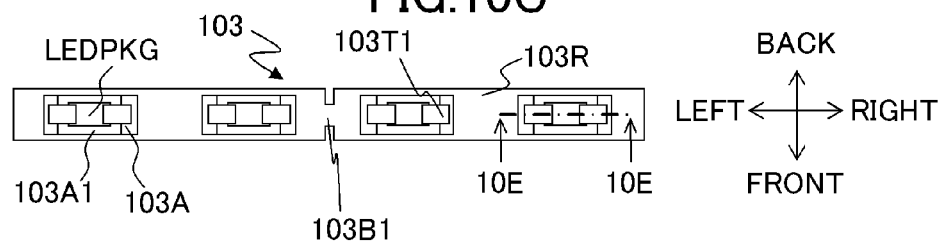
Figure 10D:
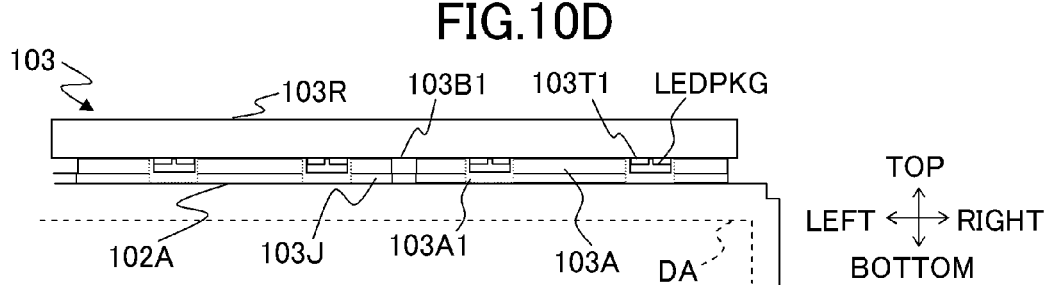
Figure 10E:
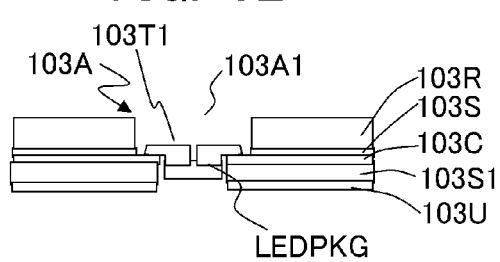
Figure 10F:
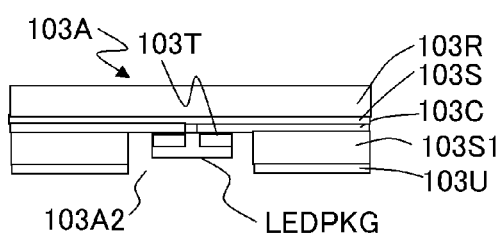

FIG. 10A and FIG. 10F are views showing the constitution of an illuminating device according to this embodiment, and the light source unit 103 which is used in the liquid crystal display device 1 where the illuminating device is used as the backlight 101. In these drawings, FIG. 10A is a plan view of the light source unit 103 as viewed from above, and FIG. 10B is a plan view of a light guide plate 102 and the light source unit 103 as viewed from a front side. In this embodiment, light source substrates 103A are not completely divided from each other, but connecting portions 103B1 having a narrow width are formed on proper portions of the light source substrates 103A. Due to such a constitution, in the same manner as LED packages LEDPKG which are bent following the bending of the incident surface 102A of the light guide plate 102 in the front-and-back direction, the light source substrates 103A are also bent. Although not shown in the drawings, a plurality of narrowed connecting portions 103B1 may be formed on one light source substrate.

The connecting portion 103B1 has the substantially same function as the connecting line 103B of the first embodiment explained in conjunction with FIG. 2. Due to such a constitution, it is possible to produce the light source unit 103 by working one substrate thus giving rise to an advantageous effect that manufacturing steps can be simplified.

[Modification of Fifth Embodiment]

The modification of the fifth embodiment is explained in conjunction with FIG. 10C to FIG. 10F. FIG. 10C is a plan view of the light source unit 103 as viewed from a top side, and FIG. 10D is a plan view of the light guide plate 102 and the light source unit 103 as viewed from a front side. FIG. 10C to FIG. 10E show the constitution where the through hole 103A1 is formed in the light source substrate 103A, and the LED package LEDPKG is inserted into the through hole 103A1 so that light is incident on the light guide plate 102 through the through hole 103A1. The light source substrate 103A is fixed to the incident surface 102A of the light guide plate 102 (In the drawing, the light source substrate 103A being fixed using the adhering member 103J, also adhering means such as a tacky member, a pressure-sensitive adhesive double-coated member such as a pressure-sensitive adhesive double-coated tape being used). Since a surface of the light source substrate 103A is adhered to the incident surface 102A of the light guide plate 102, fixing is made within a wide area thus providing the constitution where the light guide plate 102 and the light source substrate 103A are strongly adhered to each other. Further, a distance between the LED package LEDPKG and the light guide plate 102 is approximately the difference between a thickness of the LED package LEDPKG and a thickness of the light source substrate 103A and hence, the distance can be controlled by adjusting the thickness of the light source substrate 103A. Various structures are considered as the layer structure of the light source substrate 103A. For example, the light source substrate 103A may be formed by laminating an insulation resin substrate (also used as a core member) which constitutes an insulation layer made of a resin material such as glass epoxy and having a thickness of 0.1 to 1.0 mm, a layer for a substrate line 103C made of a metal foil such as a copper foil, and an insulation layer from an incident surface 102A side, for example. In this modification, there is shown an example where a layer formed of a metal plate 103R is mounted on the insulation layer by taking the heat radiation into consideration. Due to such a constitution, heat of the LED package LEDPKG is conducted or transferred to the light guide plate 102 through the insulation resin substrate and hence, the heat transfer from the LED package LEDPKG to the light guide plate 102 is harder compared to the heat transfer through metal or the like whereby the temperature elevation of the light guide plate 102 can be suppressed. Heat is radiated to the outside from the metal plate 103R. It is desirable that the metal plate 103R is, instead of a simple planar shape, formed of a plate having an L-shaped cross-sectional shape as viewed from a right side or (a left side) which is a shape capable of enhancing the heat radiation. Further, it is desirable to arrange a sheet having high reflectance on an incident surface side of the light source substrate. Such a sheet may be, for example, a white reflection sheet, a mirror reflection sheet on which aluminum or silver is vapor-deposited or the like. A reflection resist may be applied to the incident surface side of the light source substrate by coating. The detail of the layer constitution of the light source substrate ranging from the reflection resist 103U to the metal plate 103R is exemplified in FIG. 10E. FIG. 10E is a cross-sectional view taken along a line 10E-10E in FIG. 10C. The layer constitution is formed by laminating the reflection resist 103U, the insulation resin substrate 103S1, the substrate line 103C, the insulation film 103S and the metal plate 103R in order from an incident surface side. An adhesive layer (adhesive material) or a tacky adhesive layer (tacky adhesive material) not shown in the drawing may be provided between the respective layers. Although a thickness of the insulation resin substrate 103S1 depends on a shape of the LED package LEDPKG, in this embodiment, the thickness of the insulation resin substrate 103S1 is set larger than a thickness of the LED package LEDPKG so as to prevent the LED package LEDPKG from coming into contact with the incident surface 102A of the light guide plate 102. Further, it is desirable that the insulation film 103S is thinner than the insulation film 103S1. This is because it is necessary to set the heat resistance in the direction toward the metal plate 103R smaller than the heat resistance toward the light guide plate 102 for releasing heat generated by the LED package LEDPKG to the metal plate 103R without releasing heat to the light guide plate 102.

Further, the lead line 103T1 which goes out from the LED package LEDPKG is soldered to the substrate line 103C which is arranged on a back side of a surface of the light source substrate 103A (to be more specific, the insulation resin substrate) which faces an incident surface 102A of the light source substrate 103A. Further, as shown in FIG. 10C, to ensure the insulation between the metal plate 103R and the lead line 103T1 of the LED package LEDPKG, a hole (opening portion) is formed in the metal plate 103R corresponding to the through hole 103A1 so as to prevent the metal plate 103R from coming into contact with the lead line 103T1. A thickness of the metal plate 103R is set larger than a thickness of the lead line 103T1 of the LED package LEDPKG so as to ensure the insulation between the lead line 103T1 of the LED package LEDPKG and external metal or the like (see FIG. 10E). Another example of the light source substrate 103A is exemplified in FIG. 10F. The through hole 103A1 which corresponds to the arrangement position of the LED package LEDPKG is not formed in the light source substrate 103A shown in FIG. 10F, and a hole (opening portion 103A2) is formed only in the insulation resin substrate 103S1, and an LED package LEDPKG is arranged in the inside of the opening portion 103A2. The light source substrate 103A is fixed to the incident surface 102A of the light guide plate 102 (the light source substrate 103A being fixed using an adhering member 103J, also adhering means such as a tacky adhesive member, a pressure-sensitive adhesive double-coated member such as a pressure-sensitive adhesive double-coated tape being used). Since a surface of the light source substrate 103A is adhered to the incident surface 102A of the light guide plate 102, fixing is made within a wide area thus providing the constitution where the light guide plate 102 and the light source substrate 103A are strongly adhered to each other. The basic constitution of the light source substrate 103A shown in FIG. 10F is substantially equal to the basic constitutions of the light source substrates 103A shown in FIG. 10C, FIG. 10D and FIG. 10E, while the light source substrate 103A shown in FIG. 10F differs from the source substrates 103A shown in FIG. 10C, FIG. 10D and FIG. 10E with respect to a point that a portion in which an LED package LEDPKG is arranged is formed of the opening portion 103A2 instead of a through hole 103A1. FIG. 10F is a cross-sectional view taken along a line 10E-10E in FIG. 10C. The layer constitution is formed by laminating the reflection resist 103U, the insulation resin substrate 103S1, a layer formed of the substrate line 103C, the insulation film 103S and the metal plate 103R in order from an incident surface side. An adhesive layer (adhesive material) or a tacky adhesive layer (tacky adhesive material) not shown in the drawing may be provided between the respective layers. However, the layer constitution is described by considering such an adhesive layer as a part of any one of the reflection resist 103U, the insulation resin substrate 103S1, the substrate line 103C, the insulation film 103S and the metal plate 103R. A thickness of the insulation resin substrate 103S1 is set larger than a thickness of the LED package LEDPKG so as to prevent the LED package LEDPKG from coming into contact with the incident surface 102A of the light guide plate 102. Further, it is desirable that the insulation film 103S is thinner than the insulation resin substrate 103S1. This is because it is necessary to set the heat resistance in the direction toward the metal plate 103R smaller than the heat resistance toward the light guide plate 102 for releasing heat generated by the LED package LEDPKG to the metal plate 103R without releasing heat to the light guide plate 102. A shape of the opening portion 103A2 as viewed from a light emitting surface side of the LED package LEDPKG may be any shape such as a rectangular shape or a circular shape and is not particularly limited. Further, only the insulation resin substrate 103S1 may be divided corresponding to positions where the LED package LEDPKG is arranged. That is, the LED package LEDPKG may be arranged between the insulation resin substrates 103S1. Although it is desirable that the insulation resin substrate 103S1 is arranged on both sides of all LED packages LEDPKG except for the LED packages LEDPKG at ends of the substrate or the like, the insulation resin substrate 103S1 may not be arranged on both sides of the LED package LEDPKG, and may be arranged at predetermined intervals. According to the above-mentioned constitution, the metal plate 103R is arranged on a back surface of the LED package LEDPKG, and is not mounted on the insulation resin substrate 103S1 by soldering. Accordingly, this modification can acquire an advantageous effect that the heat resistance in the heat transfer from the LED package LEDPKG to the metal plate 103R is low, and the heat resistance in the heat transfer from the LED package LEDPKG to the light guide plate by way of the insulation resin substrate 103S1 is high. Due to the provision of the layer structure in which the insulation resin substrate 103S1 is arranged on the incident surface side, the layer formed of the substrate line 103C is arranged at a position remoter from the incident surface than the insulation resin substrate 103S1, and the layer formed of the insulation film 103S is arranged on the light source substrate at a position remoter from the incident surface than the layer formed of the substrate line 103C, it is possible to acquire the above-mentioned various advantageous effects.

With the constitution of the light source substrate explained above, this modification can acquire the following outstanding advantageous effects. That is, in the constitution for fixing the light source substrate 103A to the light guide plate 102, the light guide plate 102 and the light source substrate 103A are strongly adhered to each other and hence, the insulation between the LED package LEDPKG and the light guide plate can be easily ensured, a distance between the LED package LEDPKG and the light guide plate 102 can be also easily controlled, and the heat can be also easily radiated due to the combination of the light source substrate and the heat radiation member. The layer constitution of the light source substrate 103A according to this modification can acquire the above-mentioned various advantageous effects provided that the light source substrate 103A is fixed to the light guide plate 102.

In this embodiment, the light source substrates 103A are not completely divided from each other, but the connecting portions 103B1 having a narrow width are formed at the proper portions of the light source substrates 103A. A width of the metal plate 103R is also narrowed along with the narrowing of the width of the connecting portions 103B1.

The layer constitution of the light source substrate 103A explained in conjunction with this modification is not limited to this modification and is applicable to various constitutions explained in conjunction with other modifications when appropriate.

It is needless to say that various constitutions explained in conjunction with this embodiment can be carried out by combining them without departing from the gist of the present invention.

Sixth Embodiment

Figure 11A:
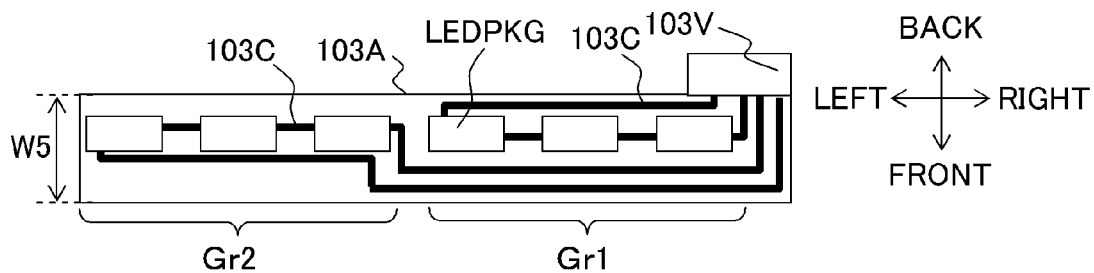
FIG. 11A to FIG. 11D are views for explaining a sixth embodiment.
Figure 11B:
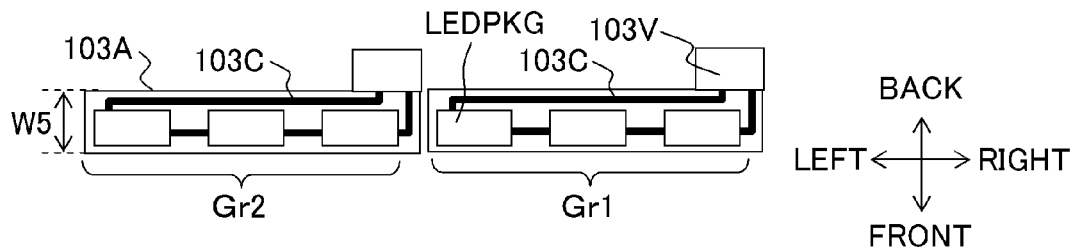
Figure 11C:
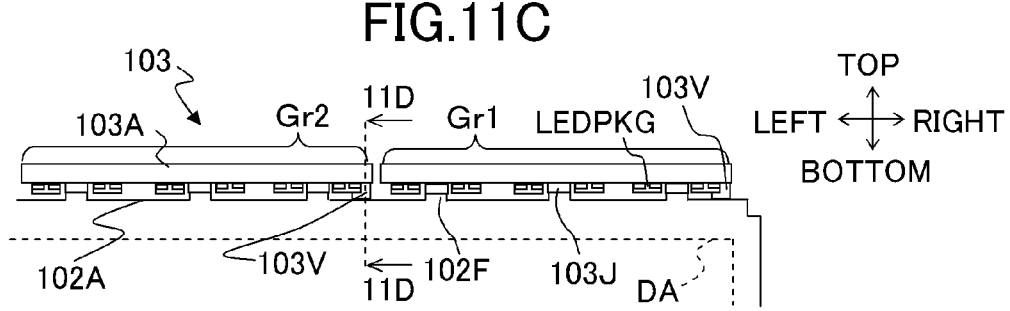
Figure 11D:
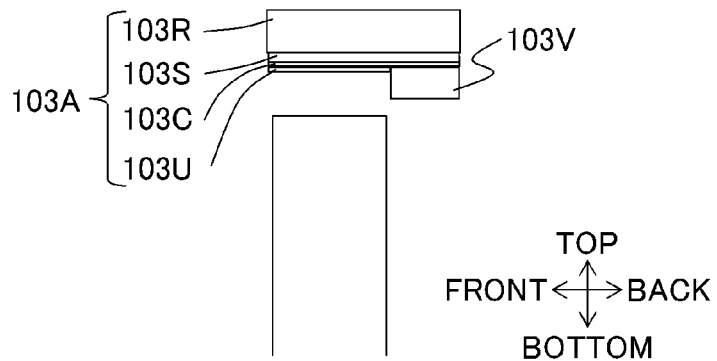

FIG. 11A to FIG. 11D are views for explaining an illuminating device according to this embodiment, and the light guide plate 102 and the light source unit 103 used in the liquid crystal display device 1 which uses such an illuminating the device as the backlight 101, wherein FIG. 11A and FIG. 11B are views showing wiring examples of the light source substrate 103A, FIG. 11C is a plan view of the light guide plate 102 and the light source unit 103 as viewed from a front side, and FIG. 11D is a cross-sectional view taken along a line 11D-11D in FIG. 11C. In this embodiment, the explanation is made with respect to the relationship between the division number of the light source substrate 103A and the area division number (the number of groups of light sources to be controlled independently) of the backlight 101 which performs so-called local dimming where the light sources are driven for every specific group of light sources so that light is irradiated to the specific area of the light guide plate whereby the dimming is performed for every specific area and an image of the liquid crystal display device 1 is controlled in association with the dimming control. The backlight which performs the local dimming has been also described in the first embodiment or the like. The liquid crystal display device of this embodiment is provided with a drive means which independently drives the predetermined group of light sources.

In controlling the group of light sources independently, it is necessary to adopt the constitution which can also electrically control the line connection of the LED package LEDPKG in the inside of the light source substrate 103A independently for every group. A width W5 of the light source substrate 103A in the front-and-back direction may preferably be made as small as possible since the width W5 influences a thickness of the backlight 101.

The width W5 can be made small by connecting the LED packages LEDPKG belonging to the predetermined group of light sources in series. However, when the groups of light sources differ from each other, these LED packages cannot be connected in series so that it is necessary to arrange the LED packages LEDPKG parallel to each other as in the case of a comparison example shown in FIG. 11A whereby the width W5 is increased. For example, in case of an illuminating device (backlight 101) having a diagonal length exceeding 32 inches, the light source substrate 103A may be divided in approximately 32. It is needless to say that the division number of the light source substrate 103A may be further increased. Since the width W5 is increased corresponding to the division number and hence, the larger the size of the illuminating device becomes, the larger the influence exerted on a thickness of the backlight 101 becomes.

Accordingly, in this embodiment, in the enhancement of light utilization efficiency by fixing the light source to the light guide plate 102, the light source substrate 103A is divided to cope with a warp and waviness of the light guide plate 102. Here, by making the division number of the light source substrate 103A correspond to the number of groups of light sources which are independently controlled, this embodiment can acquire two advantageous effects, that is, the countermeasure to cope with a warp of the light guide plate 102 and the decrease of the width W5 of the light source substrate 103A. Further, in adopting the constitution where the light source unit is fixed to the light guide plate, when the width W5 is large, the light source substrate is hardly bent even when a warp or waviness is generated in the light guide plate in the front-and-back direction so that it is necessary to prevent the light source substrate from being removed (or peeled off) from the light guide plate by increasing the division number of the light source substrate in the light source unit. However, the increase of the number of light source substrates to be fixed influences the number of operation steps and the like and hence, the number of light source substrates may preferably be 2 to 20 per 1 light source unit. Further, when the width W5 is large, the warp of the light source substrate in the normal direction is also increased so that there arises a drawback that the light source substrate is liable to be peeled off when the light source substrate is fixed to the light guide plate by an adhering means. Accordingly, the constitution explained in conjunction with this embodiment which decreases the width of the width W5 can also acquire advantageous effects that the division number per 1 light source unit can be set to the proper number, and the removal of the light source unit from the light guide plate can be prevented.

For example, as shown in FIG. 11B, by dividing the light source substrate 103A for each group of light sources (Gr1, Gr2) and by providing a connector 103V which connects a line for supplying electricity from the outside to each group of light sources (Gr1, Gr2), the width W5 of the light source substrate 103A can be decreased. In FIG. 11B, the LED packages LEDPKG are connected in series. This constitution can minimize the width W5. It is needless to say that the wiring within the LED package LEDPKG may take any connection mode. That is, the wiring in the LED package LEDPKG may adopt wiring which is the mixture of series connection and the parallel connection.

Further, a method of connecting the LED packages LEDPKG is also not particularly limited. That is, the LED packages LEDPKG may be wiring which is the mixture of series connection and the parallel connection. By dividing the light source substrate 103A corresponding to the groups of light sources, this embodiment can acquire an advantageous effect of decreasing the width W5.

In FIG. 11B, the light source substrate 103A is divided for each group of light sources (Gr1, Gr2) and a connector 103V which connects a line for supplying electricity from the outside is provided to the each group of light sources (Gr1, Gr2). However, this embodiment is not limited to such a constitution, and the light source substrate 103A may be divided for every plurality of groups of light sources. That is, the division of the light source substrate 103A is made using the groups of light sources as a unit. For example, assume a case where the light source substrate 103A is divided in 5 from a viewpoint of a warp of the light guide plate 102, and the groups of light sources are divided in 16 from other viewpoints such as an optical viewpoint. In this case, three groups of light sources may be allocated to four light source substrates 103A, remaining four groups of light sources may be allocated to one light source substrate 103A. Further, the number of LED packages LEDPKG which are contained in each group of light sources may differ among the groups of light sources. The reason is as follows. As the positional distribution of the brightness of the liquid crystal display device 1, considered is the constitution where the brightness at an area in the vicinity of the center of the light guide plate 102 is large and the brightness at an end of the light guide plate 102 is small. In such a case, the number of LED packages LEDPKG corresponding to the area in the vicinity of the center of the light guide plate 102 is increased, while the number of LED packages LEDPKG corresponding to the area in the vicinity of the end of the light guide plate 102 is decreased. That is, the light source substrate is provided with the integer number of groups of light sources, and one group of light sources is not arranged in a straddling manner over two light source substrates.

Further, to take the enhancement of productivity brought about by the reduction of the number of parts with respect to different parts into consideration, it is desirable that the number of LED packages LEDPKG within the group of light sources is equal among all groups of light sources belonging to a certain light source unit 103, and it is desirable that the number of group of light sources arranged on the light source substrate 103A is equal among all light source substrates 103A belonging to the certain light source unit 103. By standardizing all light source substrates 103A, the assembling efficiency of illuminating device can be enhanced and the number of errors in assembling can be decreased so that the productivity of the illuminating device can be enhanced.

FIG. 11C and FIG. 11D are views showing a case where the light source unit 103 shown in FIG. 11B is mounted on the light guide plate 102. The connector 103V is a place to which a stress such as a tensile stress is applied from the outside and hence, the connector 103V is arranged close to a light source fixing portion 102F. To suppress bending of the light source substrate 103A due to an external stress by way of the connector 103V, it is desirable to mount the connector 103V in an area within several cm from the light source fixing portion 102F. That is, it is preferable that a distance between the light source fixing portion 102F and the connector falls within approximately ¼ of a distance between the neighboring light source fixing portions 102F. It is more preferable that the light source fixing portion 102F and the connector 103V overlap with each other with respect to the positional relationship in the front-and-back direction.

It is needless to say that the various constitutions explained in this embodiment can be carried out by properly combining them without departing from the gist of the present invention.

Seventh Embodiment

Figure 12A:
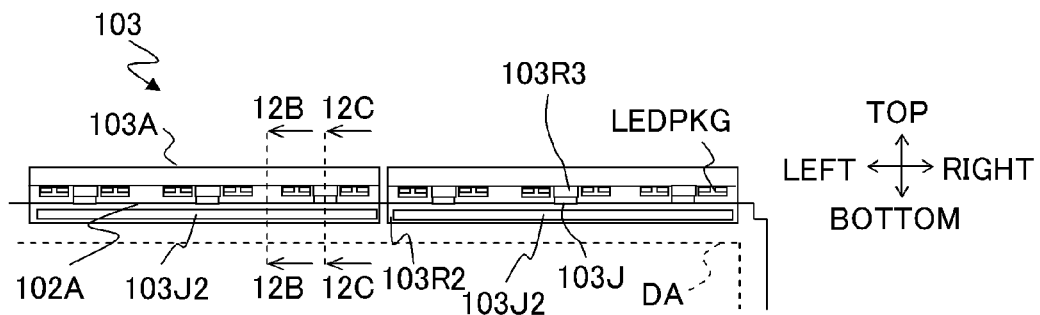
FIG. 12A to FIG. 12C are views for explaining a seventh embodiment.
Figure 12B:
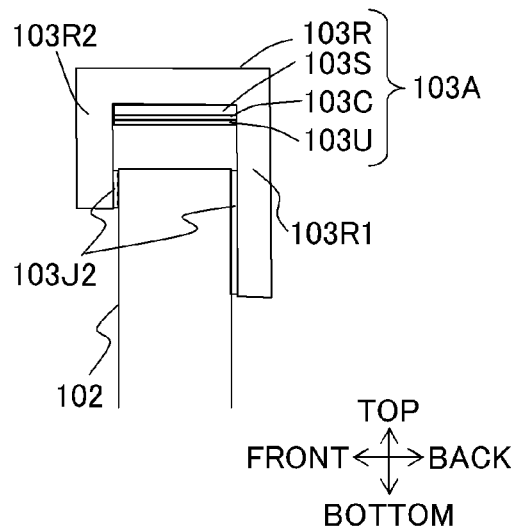
Figure 12C:
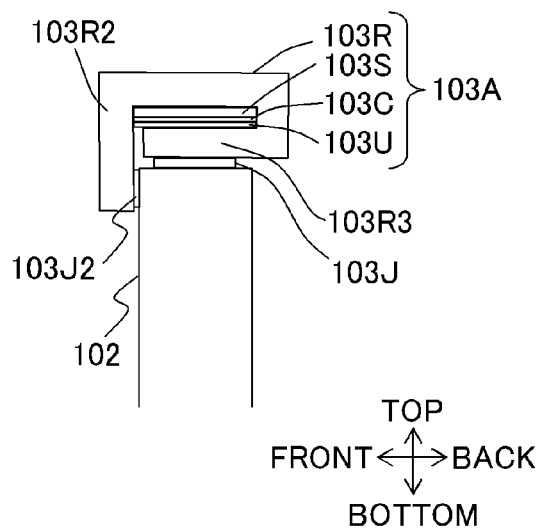

FIG. 12A to FIG. 12C are views for explaining an illuminating device according to this embodiment, and the light guide plate 102 and the light source unit 103 used in the liquid crystal display device 1 which uses such an illuminating device as the backlight 101, wherein FIG. 12A is a plan view of the light guide plate 102 and the light source unit 103 as viewed from a front side, FIG. 12B is a cross-sectional view taken along a line 12B-12B in FIG. 12A, and FIG. 12C is a cross-sectional view taken along a line 12C-12C in FIG. 12A. In this embodiment, the metal plate 103R which forms a portion of the light source substrate 103A is elongated, and portions (103R1, 103R2) of the metal plate 103R function as the light source reflectors 103P (see second embodiment) and the heat radiation members 103Q (see FIG. 16), and another portion 103R3 of the metal plate 103R functions as the light source fixing portion 102F (see FIG. 8).

In FIG. 12A, parts which are not viewed in an actual product due to the metal plate 103R, that is, LED packages LEDPKG, an incident surface 102A of a light guide plate, the portions 103R3 which function as light source fixing portions of the metal plates, adhering members 103J and the like are illustrated for facilitating the understanding of the positional relationship of the parts.

FIG. 12B is the cross-sectional view of the illuminating device which is not provided with the portion 103R3 which functions as the light source fixing portion. The metal portion 103R1 on a back side is set longer than the metal portion 103R2 on a front side since the extension of the metal portion 103R1 promotes the radiation of heat remarkably while not influencing a display. Further, a space defined between the incident surface 102A of the light guide plate 102 and the reflection resist 103U is, to prevent loss of light attributed to leakage of light, covered with the metal portions 103R1, 103R2. Further, to allow the metal portions 103R1, 103R2 to function as the light source reflector 103P, it is desirable that a reflection member such as a reflection resist or a reflection sheet is provided to a light source side of the metal portions 103R1, 103R2 (see the second embodiment with respect to the reflection member). FIG. 12B shows a case where the metal portions 103R1, 103R2 are adhered to an irradiation surface of the light guide plate and a back surface of the light guide plate opposite to the irradiation surface using an adhesive material 103J. Here, it is desirable that the adhesive material 103J is formed of an adhesive material (or a tacky adhesive material) with small scattering of light. This is because when an incident light is scatted by the adhesive material, a light guiding condition collapses so that loss of light attributed to stray light is increased and an end portion of the light guide plate becomes bright thus giving rise to a possibility that brightness irregularities or the like occur. Further, it is also desirable to use a pressure-sensitive adhesive double-coated tape made of aluminum or silver or the like instead of an adhesive agent. This is because aluminum or silver, by adhesion or tacky adhesion, reflects light leaked from the light guide plate by way of the adhesive material (tacky adhesive material) with small diffusion of light by regular reflection and hence, an original light guiding state can be preserved. It is needless to say that it is desirable to apply a mirror finish to the aluminum or silver surface.

FIG. 12C is the cross-sectional view of the illuminating device which is provided with the portion 103R3 which functions as the light source fixing portion. The portion 103R3 is provided for controlling a distance between the LED package LEDPKG and the light guide plate 102. The portion 103R3 is sandwiched between a light-guide-plate side surface of the light source substrate 103A and the light guide plate 102. In the drawing, the portion 103R3 and the light guide plate 102 are adhered to each other by the adhesive material 103J. However, when the portion 103R3 is provided only for the purpose of controlling the distance between the LED package LEDPKG and the light guide plate 102, the adhesive material 103J may not be used. To surfaces of the portion 103R3 having a normal line in the left-and-right direction, a reflection member such as a reflection sheet may be provided to reflect light from a light source in the left-and-right direction.

Further, a thickness of the metal portion 103R3 decides the distance between the LED package LEDPKG and the light guide plate 102 and hence, it is desirable that the thickness of the metal portion 103R3 is equal to or more than a thickness of the LED package LEDPKG. If the thickness of the metal portion 103R3 is smaller than the thickness of the LED package LEDPKG, it is necessary to form the metal portion 103R3 having the duplicate structure or the three-dimensional structure by bending or the like so as to make the thickness of the metal portion 103R3 larger than the thickness of the LED package LEDPKG.

This embodiment provides the constitution where the portion which plays a role of the heat radiation plate or the reflector and the portions which controls the distance between the light source and the light guide plate 102 are mounted on the light source unit 103 along the incident surface 102A of the light guide plate 102.

It is needless to say that the various constitutions explained in this embodiment can be carried out by properly combining them without departing from the gist of the present invention.

Eighth Embodiment

FIG. 13A to FIG. 13D are cross-sectional views taken along a line 12B-12B in FIG. 12 for explaining an illuminating device according to this embodiment, and the light guide plate 102 and the light source unit 103 used in the liquid crystal display device 1 which uses such an illuminating device as the backlight 101. In this embodiment, the explanation is made with respect to a constitutional example where heat from an LED package LEDPKG which is a light source is transferred to a casing (lower frame 104) from the light source substrate 103A by way of a heat transfer member thus using the casing also as a heat radiation member. It is desirable that the casing (lower frame 104) is made of a material having high heat conductivity such as iron or aluminum or a metal portion is mounted on the casing and heat is radiated to the metal portion.

According to the study which inventors of the present invention have made, with respect to an illuminating device mounted on a liquid crystal display device, a case where it is sufficient to mount a heat radiation member only on the light source unit 103 is case where the efficiency of the light source is higher than 80 lm/W. When the efficiency of the light source is 60 to 80 lm/W, depending on the specification of the illuminating device, there arise a case where the mounting of the heat radiation member only on the light source unit 103 is considered sufficient and a case where the mounting of the heat radiation member only on the light source unit 103 is considered insufficient. Further, when the efficiency of the light source is less than 60 lm/W even at maximum, it is estimated that it is necessary to release heat to the casing using a heat transfer material. It is needless to say that lowering of temperature by promoting the heat radiation is important even when the light source efficiency is high since such lowering of temperature enhances the efficiency of the light source (the efficiency of the light source being lowered corresponding to the increase of the temperature).

Assume a case where the source unit 103 is fixed to the light guide plate 102 so that the light source unit 103 is moved following the light guide plate 102 as in the case of this embodiment. When the light source unit 103 and the casing are fixed to each other by a heat radiation member which is formed by working a hard metal plate having a thickness of approximately 1 mm or more such that heat is transferred from the light source unit 103 to the casing, since the heat radiation member is hard so that even when the light guide plate 102 is thermally expanded, the light source unit 103 is hardly moved. Accordingly, the LED package LEDPKG is clamped by the heat radiation member which fixes the light guide plate 102 and the light source unit 103 to each other with a strong force so that the LED package LEDPKG is broken. Alternatively, there exists a possibility that the heat radiation member is bent so that the light source unit 103 is removed from the light guide plate 102 when a thermal shrinkage occurs in the light guide plate 102. The constitution of the heat radiation member which is effective in the constitution where the light source unit 103 is fixed to the light guide plate 102 as in the case of this embodiment so that the light source unit 103 is moved following the light guide plate 102 is explained hereinafter.

Figure 13A:
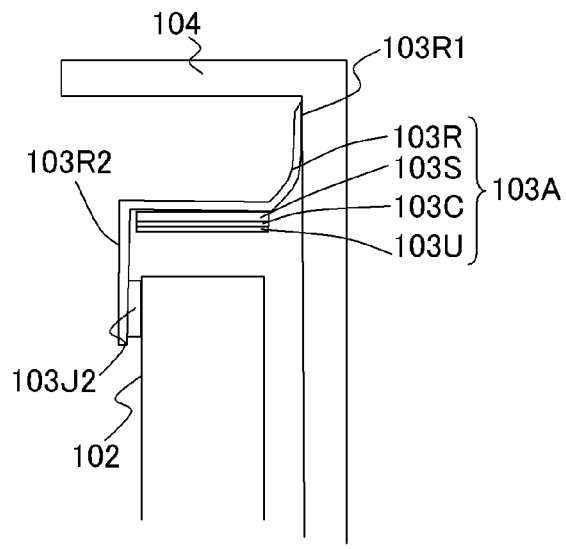
FIG. 13A to FIG. 13D are views for explaining an eighth embodiment.

FIG. 13A shows an example where the metal plate 103R is provided as a member which constitutes the light source substrate 103A, a portion 103R2 of the metal plate 103R functions as a light source reflector 103P (see second embodiment), and another portion 103R1 functions as a heat radiation member 103Q (see FIG. 16) which thermally connects the light source substrate 103A and the casing (lower frame 104). A thickness of the portion 103R1 of the metal plate which functions as the heat radiation member 103Q is less than 1 mm and has a deformable shape. It is desirable to set the thickness of the portion 103R1 to less than 0.5 mm for imparting sufficient flexibility to the portion 103R1. The portion 103R1 may also be made of a metal foil or the like. In FIG. 13A, the portion 103R1 of the metal plate extends in the direction away from the light guide plate 102 and is connected to the lower frame 104. However, the portion 103R1 may extend in the direction toward the light guide plate 102 and may be connected to the lower frame 104.

Figure 13B:
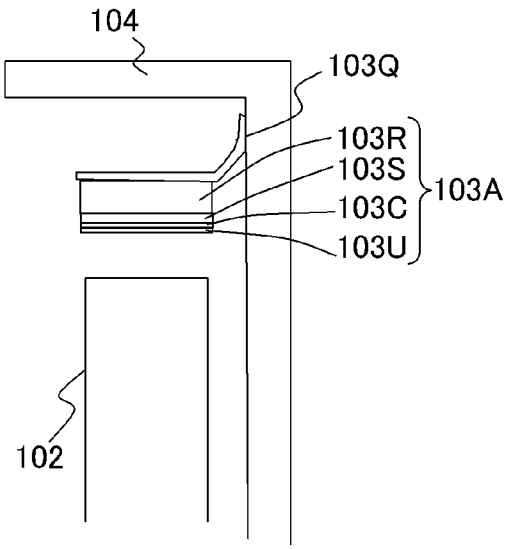

FIG. 13B shows an example where the heat radiation member 103Q which thermally connects the light source substrate 103A and the casing (lower frame 104) to each other is mounted on the light source substrate 103A. It is desirable that the heat radiation member 103Q is made of a material which exhibits high heat conductivity in the sheet in-plane direction (direction that heat is transferred in the casing) such as a thin member made of metal such as aluminum or iron, a graphite sheet or a high heat conductive resin. A material having heat conductivity of 10 W/(m·K) or more is preferable, and a material having heat conductivity of 100 W/(m·K) or more is further preferable. When the heat radiation member 103Q is made of a metal material, a thickness of the heat radiation member 103Q is less than 1 mm and has a bendable shape. It is desirable to set the thickness of the heat radiation member 103Q to less than 0.5 mm for imparting sufficient flexibility to the heat radiation member 103Q. The heat radiation member 103Q may also be made of a metal foil or the like. In FIG. 13B, the heat radiation member 103Q extends in the direction away from the light guide plate 102 and is connected to the lower frame 104. However, the heat radiation member 103Q may extend in the direction toward the light guide plate 102 and may be connected to the lower frame 104.

Figure 13C:
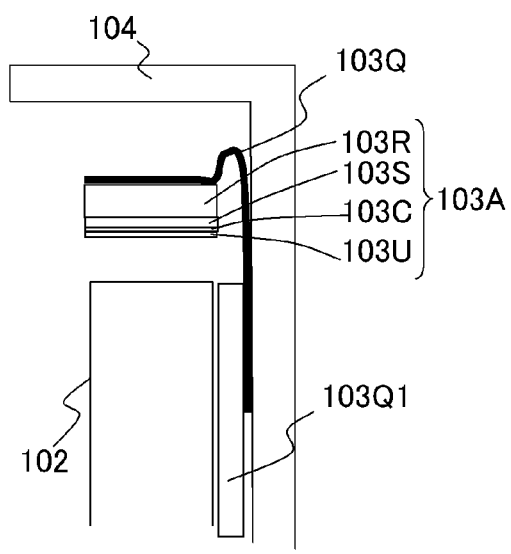

FIG. 13C shows an example of the heat radiation member where a graphite sheet is adhered to a casing (lower frame 104) as a heat radiation member 103Q which thermally connects the light source substrate 103A and the casing, and the graphite sheet extends in the direction toward the light guide plate 102 and is connected to the lower frame 4. It is needless to say that the graphite sheet may extend in the direction away from the light guide plate 102 and may be connected to the lower frame 104. The lower frame 104 and the heat radiation member 103Q are connected to each other by a method in which a heat radiation member 103Q1 which diffuses heat is sandwiched between the light guide plate 102 and the lower frame 104. Heat which flows through the heat radiation member 103Q is transferred to the lower frame 104 and the heat radiation member 103Q1 which diffuses heat so that the heat is diffused and radiated from the respective members. In this example, the heat radiation member 103Q1 which performs the heat diffusion is also used as a member which controls a position of the light guide plate 102 in the front-and-back direction. The heat radiation member 103Q1 which performs the heat diffusion has a thickness larger than a thickness of the heat radiation member 103Q. Further, the heat radiation member 103Q may be formed using the above-mentioned thin metal material or may be a metal member which is formed by working a metal material such that a portion of the metal member which is brought into contact with the casing has a large thickness and a portion of the metal member between the light source substrate and the casing has a small thickness.

Figure 13D:
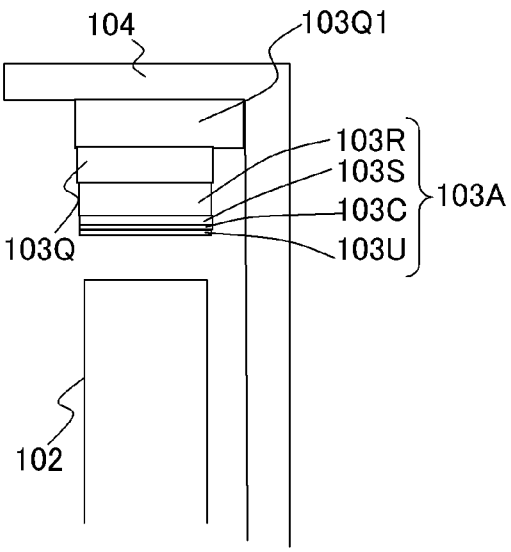

FIG. 13D shows an example of the heat radiation member where an elastic body (elastomer) having high heat conductivity is used as a heat radiation member 103Q which thermally connects the light source substrate 103A and the casing (lower frame 104), and the elastic body absorbs a load applied to the light source unit 103 due to the thermal expansion of a light guide plate 102. Heat which flows through the elastic body mainly flows into a heat radiation member 103Q1 which performs heat diffusion and the heat flows into the lower frame 104 from the heat radiation member 103Q1 which performs heat diffusion. Although the heat radiation member 103Q1 which performs heat diffusion may not be always necessary, it is preferable to use the heat radiation member 103Q1. This is because the heat radiation member 103Q1 which diffuses heat is a member having a thickness larger than a thickness of the light source substrate, the light source substrate 103A can be easily fixed to the lower frame 104.

The heat radiation member and other member may be connected to each other using bolts or an adhering means such as a tacky adhesive heat conductive sheet. Further, the heat radiation member and other member may be connected to each other using bolts with the heat radiation sheet sandwiched therebetween. Various other methods are also considered for connecting the heat radiation member and other member.

It is needless to say that the various constitutions explained in this embodiment can be carried out in all constitutions described in this specification by properly combining them without departing from the gist of the present invention.

Ninth Embodiment

FIG. 14A to FIG. 14G are views showing the constitution of an illuminating device according to this embodiment and the constitution of the light source unit 103 used in the liquid crystal display device 1 which uses the illuminating device as the backlight 101. In this embodiment, LED packages LEDPKG are directly fixed to the light guide plate 102 and the LED packages LEDPKG are connected with each other by the flexible connecting line 103B arranged therebetween. When a distance between the LED package LEDPKG and the light guide plate 102 becomes narrow, a change of the light utilization efficiency with respect to the distance is increased. In a case where the distance is less than approximately 0.75 mm, even when a change of the distance is several hundreds μm, there may be a case where irregularities arise in a display due to the difference in light utility efficiency based on position. To overcome this drawback, this embodiment provides the constitution where distance between the LED package LEDPKG and the light guide plate 102 is less changed.

Figure 14A:
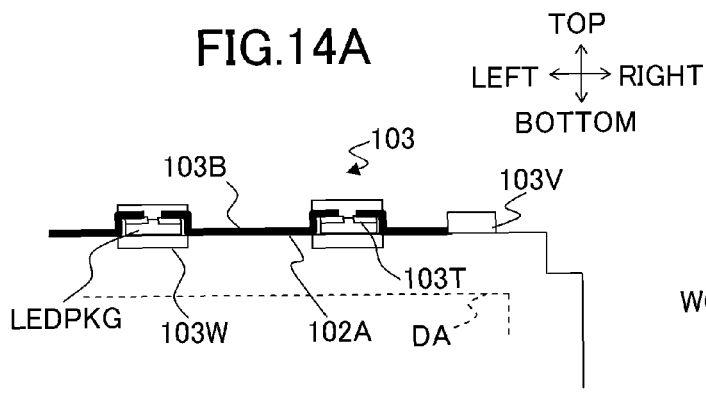
FIG. 14A to FIG. 14G are views for explaining a ninth embodiment.

FIG. 14A shows an example where LED packages LEDPKG are adhered to the light guide plate 102 at predetermined positions using a light source fixing tape 103W. It is desirable that a reflection property such as a mirror reflection property is imparted to an inner side of the light source fixing tape 103W. It is desirable that the light source fixing tape 103W is formed of a mirror reflection tape made of aluminum or silver. This is because, by adhering the LED package LEDPKG to the light guide plate 102 using the mirror reflection tape by adhesion or tacky adhesion, light leaked from the light guide plate by way of the adhesive material (tacky adhesive material) with small diffusion of light is reflected by regular reflection and hence, an original light guiding state can be preserved so that no loss of light occurs.

Figure 14B:
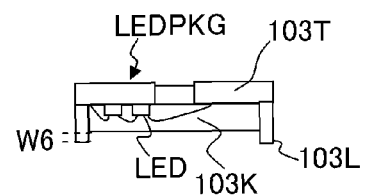

FIG. 14B is a detailed view of the LED package LEDPKG mounted on the light source unit 103 shown in FIG. 14A. The explanation of the parts which are explained in conjunction with the first embodiment is omitted. The common technical feature shared by the LED packages LEDPKG of this embodiment lies in that the sealing resin 103K does not project from the LED casing 103L. A distance W6 between a surface of the sealing resin 103K and an upper surface of the LED casing 103L is 10 μm or more, To take the thermal expansion of the sealing resin 103K into consideration, it is preferable to set the distance W6 to 0.1 mm or more. To allow light emitted from the LED package LEDPKG to be incident on the light guide plate 102 and to be guided through the light guide plate 102, it is necessary for light which is irradiated from a resin such as the sealing resin 103K to pass through air once and to be incident on the light guide plate 102. It is because when the light is incident on the light guide plate 102 through air, a refraction angle of the light after being incident on the light guide plate 102 falls within an angle range where a reflection angle of light on a side surface of the light guide plate 102 perpendicular to an incident surface becomes a total reflection angle or more so that the light is guided in the light guide plate 102. Accordingly, to form an air layer between the sealing resin 103K and the light guide plate 102, this embodiment adopts the constitution which prevents the sealing resin 103K from projecting to the outside of the LED package LEDPKG exceeding the LED casing 103L.

Figure 14C:
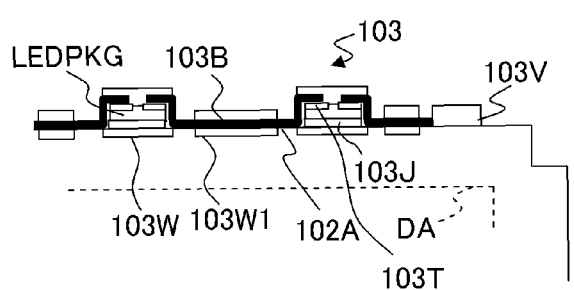

FIG. 14C shows an example where LED packages LEDPKG are adhered to the light guide plate 102 at predetermined positions using the light source fixing tape 103W and the adhesive material 103J. The LED packages LEDPKG may be adhered to the light guide plate 102 by any adhering material. That is, the LED packages LEDPKG may be adhered to the light guide plate 102 by any adhering means.

Figure 14D:
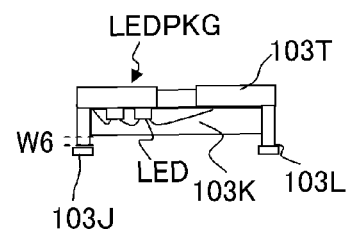
Figure 14E:
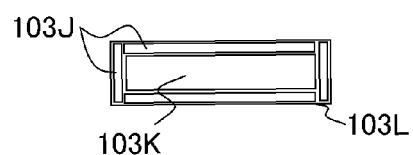

FIG. 14D shows the LED package LEDPKG arranged in FIG. 14C in detail. FIG. 14E is a view of the LED package LEDPKG arranged in FIG. 14C as viewed from a light emission side and shows an example where the adhesive material 103J is applied to the LED casing 103L.

Figure 14F:
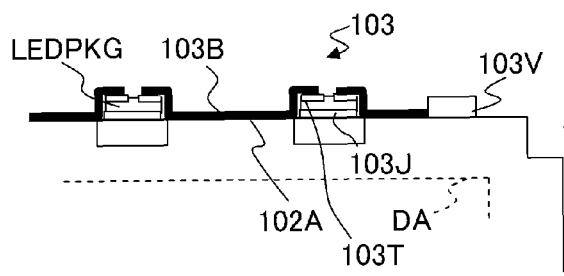
Figure 14G:
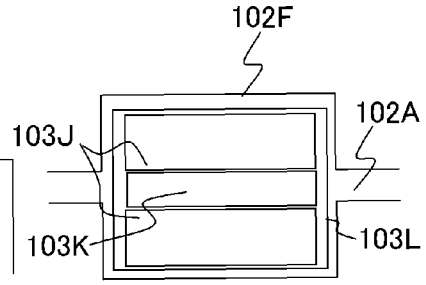

FIG. 14F shows an example where LED packages LEDPKG are adhered to the light guide plate 102 at predetermined positions using the adhesive material 103J. To prevent a stress from being applied to the LED package LEDPKG, a rectangular pedestal (light source fixing portion 102F) which projects toward the front-and-back direction is formed at a predetermined position of the light guide plate 102. FIG. 14G is a view of the LED package LEDPKG and the light guide plate 102 arranged in FIG. 14F as viewed from a light emission side and shows a point that the position where the LED package LEDPKG is arranged spreads in the front-and-back direction in a light guide plate 102. Light is irradiated from an area of the sealing resin 103K. The LED package LEDPKG has a square profile thus exhibiting a shape which shows large resistance against a stress in the front-and-back direction. Here, from a viewpoint of a method of manufacturing an illuminating device, it is sufficient to adjust one mold in injection molding and hence, it is desirable to project the pedestal on one side of the front-and-back direction. By increasing a thickness of the incident surface 102A of a portion of the light guide plate 102 on which the LED package LEDPKG is mounted, it is possible to acquire an advantageous effect that a strength of the fixing portion is increased. In this embodiment, the light source fixing portion 102F plays a role of the light source substrate 103A to which the LED package LEDPKG is fixed in a stable manner.

Tenth Embodiment

Figure 15:
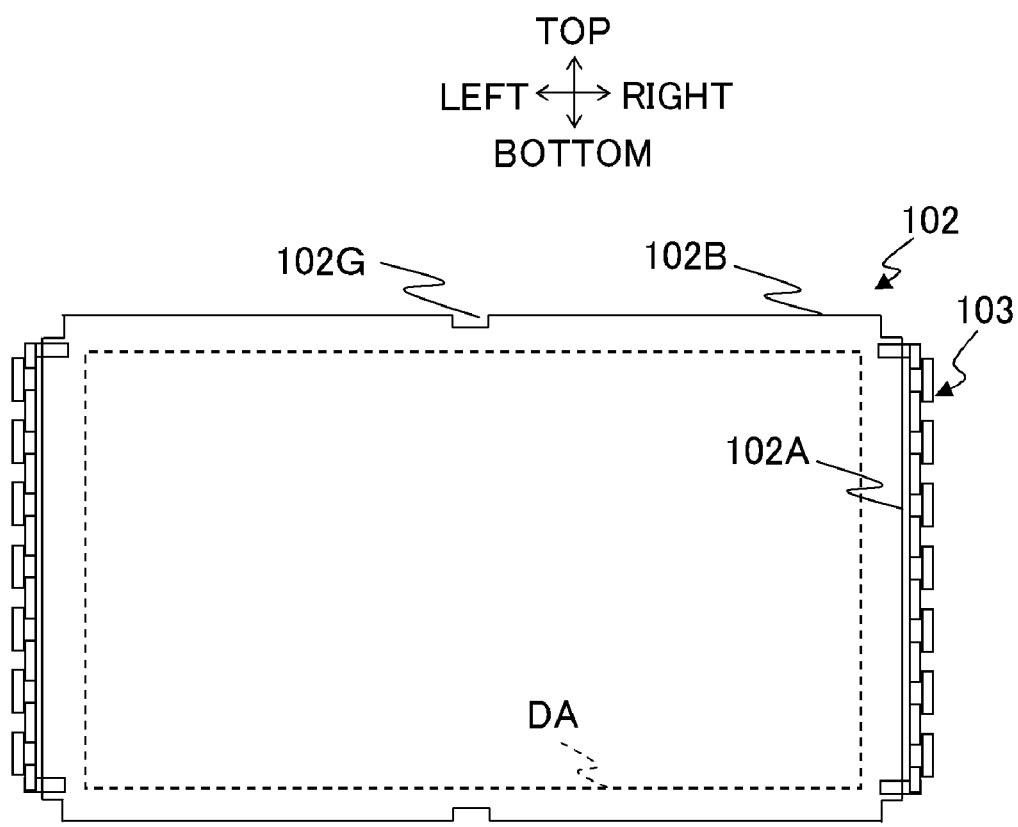
FIG. 15 is a view for explaining a tenth embodiment.

FIG. 15 is a view showing the constitution of an illuminating device according to this embodiment and the constitution of the light source unit 103 used in the liquid crystal display device 1 which uses the illuminating device as the backlight 101. Although the top and bottom side surfaces of the light guide plate are used as incident surfaces in the first to ninth embodiments, this embodiment exemplifies an example where left and right side surfaces of the light guide plate are used as incident surfaces.

In the drawing, the engaging portion 102G which fixes the light guide plate 102 to a casing is formed on the side surfaces 102B (hereinafter, referred to as fixing surfaces) of the light guide plate 102 perpendicular to side surfaces (incident surfaces 102A) of the light guide plate 102 which face a light source substrate in an opposed manner. This constitution is provided for allowing the light guide plate 102 to be elongated in the normal direction (the left-and-right direction in the drawing) of the incident surface 102A with reference to the engaging portions 102G when the light guide plate 102 is thermally expanded. A gap which allows the elongation of the light guide plate 102 is present between the light source unit 103 and a lower frame 104 which constitutes a casing.

The engaging portion 102G is provided on both the fixing surfaces 102B at positions where distances from the respective incident surfaces are approximately equal. This arrangement is adopted for allowing the movement of the incident surfaces 102A due to the thermal expansion of the light guide plate 102 to take place in a state where the incident surfaces 102A are parallel to each other. This embodiment adopts the constitution which releases the elongation of the light guide plate 102 generated by thermal expansion in the top-and-bottom direction and in the left-and-right direction. Accordingly, a gap is also formed between the fixing block 107 and the engaging portion 102G to allow the elongation of the light guide plate 102 due to the thermal expansion also in the top-and-bottom direction.

The configurations which have been explained in conjunction with the first embodiment to the ninth embodiment are also applicable to a case where left and right side surfaces of the light guide plate constitute incident surfaces when appropriate.

Further, as has been explained in conjunction with the first embodiment, by performing a control of the light emission or non light emission of light sources in synchronism with the driving of scanning lines, it is possible to acquire an advantageous effect that a moving picture performance of a liquid crystal display device is enhanced or an advantageous effect that crosstalk which occurs at the time of displaying a 3D image by displaying an image for a right eye and an image for a left eye with time division can be suppressed. When a light source unit is arranged on the left-and-right side surfaces, the left-and-right side surfaces of the light guide plate constitute the incident surfaces, and the top-and-bottom direction is the direction along which scanning lines are sequentially scanned, since the light sources are arranged in the top-and-bottom direction, it is possible to drive the light sources in synchronism with the scanning lines by vertically scanning the light sources for every predetermined group of light sources. Since the scanning direction of the scanning lines and the scanning direction of the light sources are equal, it is possible to acquire an advantageous effect that the number of division for controlling the light sources by making timing of light emitting/non-light emitting timing different from each other can be easily increased by increasing the number of groups of light sources which can be driven independently. This advantageous effect that the number of division can be easily increased also can be acquired even when the scanning direction is the left-and-right direction provided that the scanning direction is equal between the scanning lines and the light sources.

Further, with respect to the heat radiation, the upper a member is arranged, the more difficult the release of heat becomes. Accordingly, it is desirable to provide the constitution where the upper the heat radiation member provided to the light source unit 103 is arranged, the larger a size (thickness, length, the number of members) of the heat radiation member mounted on the light source unit 103 becomes.

It is needless to say that the configurations explained in conjunction with the first to ninth embodiments are also applicable to a case where the light source unit 103 is arranged only on the lower side surface of the light guide plate 102 when appropriate.

The most effective constitution is obtained by arranging the light source unit 103 on two side surfaces of the light guide plate 102 arranged opposite to each other. On the other hand, when the incident surface is provided to only one side surface of the light guide plate 102, by arranging the light source unit 103 in the casing, by arranging the engaging portion 102G which fixes the light guide plate 102 to the casing on the fixing surface 102B close to the incident surface, and by setting the thermal expansion direction of the light guide plate 102 to the direction directed to away from the incident surface, it is possible to shorten the distance between the incident surface and the LED package LEDPKG thus arranging the incident surface and the LED package close to each other to some extent. Further, when the light source unit 103 is arranged in the casing in a state where the light source unit 103 faces the two side surfaces of the light guide plate 102 arranged opposite to each other, the distance between incident surface and the LED package LEDPKG can be shortened so as to make the incident surface and the LED package LEDPKG close to each other to some extent with respect to one side surface, it is necessary to ensure the large distance between the incident surface and the LED package LEDPKG with respect to the other side surface so that the light utilization efficiency is not enhanced as a whole. Accordingly, the constitution where the light source unit 103 is arranged on the two side surfaces of the light guide plate 102 arranged opposite to each other can acquire the largest advantageous effect in this embodiment.

Further, the illuminating device which is used as the backlight in the liquid crystal display device which has been explained in conjunction with this embodiment can be used as a single illuminating device by using a casing having an opening portion on a front surface of the light guide plate.

What is claimed is:
1. A liquid crystal display device comprising:
a light guide plate which includes a front surface, a back surface and a side surface which connects a periphery of the front surface and a periphery of the back surface to each other;
a casing which is arranged to face the side surface in an opposed manner with a distance away from the side surface of the light guide plate;
a light source unit which is arranged between the side surface of the light guide plate and the casing or between the side surface of the light guide plate and a wall surface which is connected to the casing, the light source unit being arranged with a distance away from the casing or the wall surface which is connected to the casing, the light source unit allowing light to be incident on the side surface of the light guide plate; and
a liquid crystal panel which is arranged on the front surface of the light guide plate, wherein
the light source unit includes a plurality of light sources and a light source substrate to which the light sources are fixed,
the light source unit is fixed to the light guide plate in a state where a predetermined distance from the side surface of the light guide plate is held,
the side surface of the light guide plate includes a first side surface which faces the light source unit in an opposed manner, and a second side surface which is directed in the second direction orthogonal to the first direction which is the direction along which the light source unit and the first side surface face each other in an opposed manner,
an engaging portion which is engageable with the casing is formed on the second side surface or an edge portion which forms the second side surface, and
the engaging portion is configured to allow a change of a distance between the first side surface and the casing due to expansion or shrinkage of the light guide plate while restricting the movement of the light guide plate in the first direction.

2. The liquid crystal display device according to claim 1, wherein fixing of the light source unit to the light guide plate is performed for every the one light source or one group of the light sources.

3. A liquid crystal display device comprising:
a light guide plate which includes a front surface, a back surface and a side surface which connects a periphery of the front surface and a periphery of the back surface to each other;
a casing which is arranged to face the side surface in an opposed manner with a distance away from the side surface of the light guide plate;
a light source unit which is arranged between the side surface of the light guide plate and the casing with a distance away from the casing, and allows light to be incident on the side surface of the light guide plate; and
a liquid crystal panel which is arranged on the front surface of the light guide plate, wherein
the light source unit includes a plurality of light sources and a light source substrate to which the light sources are fixed,
the light source unit is fixed to the light guide plate in a state where a predetermined distance from the side surface of the light guide plate is held,
the light source substrate includes, between the light sources arranged adjacent to each other, a flexible portion which is bendable more easily in the direction that the side surface is bent when the front surface or the back surface of the light guide plate is bent than a portion to which the light source is fixed,
the side surface of the light guide plate includes a first side surface which faces the light source unit in an opposed manner, and a second side surface which is directed in the second direction orthogonal to the first direction which is the direction along which the light source unit and the first side surface face each other in an opposed manner,
an engaging portion which is engageable with the casing is formed on the second side surface or an edge portion which forms the second side surface, and
the engaging portion is configured to allow a change of a distance between the first side surface and the casing due to expansion or shrinkage of the light guide plate while restricting the movement of the light guide plate in the first direction.

4. The liquid crystal display device according to claim 3, wherein the light source substrate is fixed to the light guide plate at a position closer to the portion to which the light source is fixed than the flexible portion.

5. The liquid crystal display device according to claim 1, wherein the side surface of the light guide plate has the two first side surfaces which are directed in the directions opposite to each other, and the light source unit is arranged on the first side surfaces respectively.

6. The liquid crystal display device according to claim 1, wherein the difference between a distance between the neighboring light sources arranged on the same light source substrate and a distance between the neighboring light sources arranged on the different light source substrates is set smaller than a distance between the first side surface and an edge portion of an area of the liquid crystal panel on which an image is displayed.

7. The liquid crystal display device according to claim 1, wherein the engaging portion is positioned at a center portion of the second side surface in the longitudinal direction.

8. The liquid crystal display device according to claim 1, wherein the liquid crystal display device includes a drive means which drives the light sources individually or for every specified group of light sources, and
the integer number of light source groups which are groups of light sources are arranged on the light source substrate.

9. The liquid crystal display device according to claim 8, wherein the plurality of light source groups are provided, and the number of light sources is equal among the respective light source groups.

10. The liquid crystal display device according to claim 8, wherein the plurality of light source groups are provided, and the number of light source groups is equal among the respective light source substrates.

11. The liquid crystal display device according to claim 1, wherein through holes are formed in the light source substrate in a penetrating manner, and the light sources are inserted into the through holes so that light is incident on the light guide plate through the through holes.

12. The liquid crystal display device according to claim 1, wherein the light source substrate has a portion which is formed of layers consisting of, in order from a side close to the side surface of the light guide plate, a resin layer, a substrate line layer formed of a metal foil and an insulation layer.

13. The liquid crystal display device according to claim 1, wherein the layer constitution of the light source substrate is constituted of, in order from a side close to the side surface of the light guide plate, a resin layer, a substrate line layer which is formed of a metal foil, an insulation layer, and a metal plate which constitutes a heat radiation member.

14. The liquid crystal display device according to claim 1, wherein a portion which projects in the normal direction of the incident surface of the side surface on which light is incident is formed on the incident surface, and the portion constitutes a member which controls a distance between the light source and the light guide plate.

15. The liquid crystal display device according to claim 1, wherein the difference among a distance between the neighboring light sources arranged on the same light source substrate, a distance between the neighboring light sources arranged on the different light source substrates, and a distance between the neighboring light sources with a portion projecting in the normal direction of the incident surface present on the incident surface is set smaller than a distance between the first side surface and an edge portion of an area of the liquid crystal panel on which an image is displayed.

16. The liquid crystal display device according to claim 1, wherein the light source substrate includes a metal plate, and a portion of the metal plate extends parallel to an incident surface which is the side surface allowing light to be incident on the light guide plate, and is sandwiched between a surface of the light source substrate on a light guide plate side and the light guide plate.

17. The liquid crystal display device according to claim 1, wherein the casing has a metal portion,
and a heat radiation member which thermally connects the light source substrate and the metal portion is provided.

18. The liquid crystal display device according to claim 1, wherein a rectangular pedestal which projects in the direction toward at least one of the front surface and the back surface is arranged at a position of the light guide plate corresponding to a position of the light source.

19. An illuminating device comprising:
- a light guide plate which includes a front surface, a back surface and a side surface which connects a periphery of the front surface and a periphery of the back surface to each other;
- a casing which is arranged to face the side surface in an opposed manner with a distance away from the side surface of the light guide plate; and
- a light source unit which is arranged between the side surface of the light guide plate and the casing or between the side surface of the light guide plate and a wall surface which is connected to the casing, the light source unit being arranged with a distance away from the casing or the wall surface which is connected to the casing, the light source unit allowing light to be incident on the side surface of the light guide plate; wherein
- the light source unit includes a plurality of light sources and a light source substrate to which the light sources are fixed,
- the light source unit is fixed to the light guide plate in a state where a predetermined distance from the side surface of the light guide plate is held,
- the side surface of the light guide plate includes a first side surface which faces the light source unit in an opposed manner, and a second side surface which is directed in the second direction orthogonal to the first direction which is the direction along which the light source unit and the first side surface face each other in an opposed manner,
- an engaging portion which is engageable with the casing is formed on the second side surface or an edge portion which forms the second side surface, and
- the engaging portion is configured to allow a change of a distance between the first side surface and the casing due to expansion or shrinkage of the light guide plate while restricting the movement of the light guide plate in the first direction.

20. The illuminating device according to claim 19, wherein fixing of the light source unit to the light guide plate is performed for every the one light source or one group of the light sources.

21. The illuminating device according to claim 19, wherein the side surface of the light guide plate has the two first side surfaces which are directed in the directions opposite to each other, and the light source unit is arranged on the first side surfaces respectively.

22. The liquid crystal display device according to claim 1, wherein the light source substrate is fixed to the light guide plate by an adhering means;
- at least a portion of the layer constitution of the light source substrate at a predetermined position is constituted of, in order from a side close to the side surface of the light guide plate, a first insulation layer, a substrate line layer which is formed of a metal foil at a position remoter from the side surface than the first insulation layer, and a second insulation layer which is formed at a position remoter from the side surface than the substrate line layer, and
- the first insulation layer is thicker than the second insulation layer, and the predetermined position is disposed between the light source and the light source.

23. The illuminating device according to claim 19, wherein the plurality of light source substrates are provided.

24. The illuminating device according to claim 19, wherein the light source substrate is fixed to the light guide plate by an adhering means;
- at least a portion of the layer constitution of the light source substrate at a predetermined position is constituted of, in order from a side close to the side surface of the light guide plate, a first insulation layer, a substrate line layer which is formed of a metal foil at a position remoter from the side surface than the first insulation layer, and a second insulation layer which is formed at a position remoter from the side surface than the substrate line layer, and
- the first insulation layer is thicker than the second insulation layer, and the predetermined position is disposed between the light source and the light source.

25. The liquid crystal display device according to claim 3, wherein the side surface of the light guide plate has said two first side surfaces which are directed in the directions opposite to each other, and the light source unit is arranged on the first side surfaces respectively.

* * * * *